(12) United States Patent
Sasai et al.

(10) Patent No.: US 9,497,458 B2
(45) Date of Patent: Nov. 15, 2016

(54) IMAGE CODING METHOD, IMAGE DECODING METHOD, IMAGE CODING APPARATUS, IMAGE DECODING APPARATUS, PROGRAM, AND INTEGRATED CIRUIT

(75) Inventors: Hisao Sasai, Osaka (JP); Takahiro Nishi, Nara (JP);
(Continued)

(73) Assignee: SUN PATENT TRUST, New York, NY (US)

( * ) Notice: Subject to any disclaimer, the term of this patent is extended or adjusted under 35 U.S.C. 154(b) by 753 days.

(21) Appl. No.: 13/988,582

(22) PCT Filed: Nov. 24, 2011

(86) PCT No.: PCT/JP2011/006527
§ 371 (c)(1),
(2), (4) Date: May 21, 2013

(87) PCT Pub. No.: WO2012/070239
PCT Pub. Date: May 31, 2012

(65) Prior Publication Data
US 2013/0235933 A1    Sep. 12, 2013

Related U.S. Application Data

(60) Provisional application No. 61/417,307, filed on Nov. 26, 2010.

(51) Int. Cl.
*H04N 7/32* (2006.01)
*H04N 19/50* (2014.01)
(Continued)

(52) U.S. Cl.
CPC ........ *H04N 19/00569* (2013.01); *H04N 19/13* (2014.11); *H04N 19/46* (2014.11);
(Continued)

(58) Field of Classification Search
CPC ................... H04N 19/70; H04N 19/46; H04N 19/00569; H04N 19/61; H04N 19/573; H04N 19/13
(Continued)

(56) References Cited

U.S. PATENT DOCUMENTS

| 6,876,702 | B1* | 4/2005 | Hui | ........................ | H04N 19/51 |
| | | | | | 375/240.16 |
| 2010/0008415 | A1 | 1/2010 | Kajita | | |
| 2012/0250765 | A1* | 10/2012 | Wu | ...................... | H04N 19/105 |
| | | | | | 375/240.12 |

FOREIGN PATENT DOCUMENTS

| JP | 2003-324731 | 11/2003 |
| JP | 2003-333600 | 11/2003 |

(Continued)

OTHER PUBLICATIONS

ISO/IEC 14496-10, Information technology—Coding of audio-visual objects—Part10: Advanced Video Coding, Oct. 1, 2004.
(Continued)

*Primary Examiner* — Farzana Hossain
*Assistant Examiner* — Matthew Kwan
(74) *Attorney, Agent, or Firm* — Wenderoth, Lind & Ponack, L.L.P.

(57) ABSTRACT

An image coding method includes: obtaining first information and second information from a current signal to be coded, the first information identifying at least one reference picture list used in inter prediction of an image out of a plurality of reference picture lists, the second information identifying at least one reference picture used in the inter prediction of the image out of reference pictures included in the at least one reference picture list identified by the first information; mixing the first information and the second information to generate a mixed signal; selecting a variable-length coding table according to a maximum variation range
(Continued)

of the mixed signal; and variable-length coding the mixed signal using the selected variable-length coding table.

13 Claims, 43 Drawing Sheets

(75) Inventors: Youji Shibahara, Osaka (JP);
Toshiyasu Sugio, Osaka (JP)

(51) Int. Cl.
*H04N 19/70* (2014.01)
*H04N 19/46* (2014.01)
*H04N 19/13* (2014.01)
*H04N 19/61* (2014.01)
*H04N 19/573* (2014.01)

(52) U.S. Cl.
CPC ............ *H04N 19/573* (2014.11); *H04N 19/61* (2014.11); *H04N 19/70* (2014.11)

(58) Field of Classification Search
USPC ..................................... 375/240.12
See application file for complete search history.

(56) References Cited

FOREIGN PATENT DOCUMENTS

| | | |
|---|---|---|
| JP | 2009/105696 | 5/2009 |
| WO | 2009/078150 | 6/2009 |

OTHER PUBLICATIONS

International Search Report issued Feb. 28, 2012 in International Application No. PCT/JP2011/006527.

* cited by examiner

FIG. 4

| val | VLC table [0] | VLC table [1] | VLC table [2] | VLC table [3] | VLC table [4] | VLC table [5] |
|---|---|---|---|---|---|---|
| 0 | 1 | 10 | 100 | 1000 | 10000 | 10 |
| 1 | 01 | 11 | 101 | 1001 | 10001 | 11 |
| 2 | 001 | 010 | 110 | 1010 | 10010 | 010 |
| 3 | 0001 | 011 | 111 | 1011 | 10011 | 011 |
| 4 | 00001 | 0010 | 0100 | 1100 | 10100 | 0010 |
| 5 | 000001 | 0011 | 0101 | 1101 | 10101 | 0011 |
| 6 | 0000001 | 00010 | 0110 | 1110 | 10110 | 00010 |
| 7 | 00000001 | 00011 | 01111 | 1111 | 10111 | 00011 |
| 8 | 000000010 | 000010 | 00100 | 01000 | 11000 | 000010 |
| 9 | 000000011 | 000011 | 00101 | 01001 | 11001 | 000011 |
| 10 | 0000000100 | 0000010 | 00110 | 01010 | 11010 | 0000010 |
| 11 | 0000000101 | 0000011 | 00111 | 01011 | 11011 | 0000011 |
| 12 | 0000000110 | 00000010 | 000100 | 01100 | 11100 | 00000010 |
| 13 | 0000000111 | 00000011 | 000101 | 01101 | 11101 | 00000011 |
| ... | | | | | | |

| val | VLC table [6] | VLC table [7] | VLC table [8] | VLC table [9] | VLC table [10] |
|---|---|---|---|---|---|
| 0 | 100 | 1000 | 1 | 100 | 1 |
| 1 | 101 | 1001 | 01 | 1010 | 010 |
| 2 | 110 | 1010 | 00 | 1011 | 011 |
| 3 | 111 | 1011 | | 11000 | 00100 |
| 4 | 0100 | 1100 | | 11001 | 00101 |
| 5 | 0101 | 1101 | | 11010 | 00110 |
| 6 | 0110 | 1110 | | 11011 | 00111 |
| 7 | 0111 | 1111 | | 11100 | 0001000 |
| 8 | 00100 | 01000 | | 11101 | 0001001 |
| 9 | 00101 | 01001 | | 11110 | 0001010 |
| 10 | 00110 | 01010 | | 11111 | 0001011 |
| 11 | 00111 | 01011 | | 010000 | 0001100 |
| 12 | 000100 | 01100 | | 010001 | 0001101 |
| 13 | 000101 | 01101 | | 010010 | 0001110 |
| ... | | | | | |

| s | Symbol |
|---|--------|
| 0 | s1 |
| 2 | s2 |
| 1 | s3 |
| 3 | s4 |
| 4 | s5 |
| 5 | s6 |
| 6 | s7 |

501

| val | Max Range | | | | | | | |
|---|---|---|---|---|---|---|---|---|
| | 2 | 3 | 4 | 5 | 6 | 7 | 8 | ... |
| 0 | 1 | 1 | 1 | 1 | 1 | 1 | 1 | |
| 1 | 0 | 01 | 01 | 01 | 01 | 01 | 01 | |
| 2 | | 00 | 001 | 001 | 001 | 001 | 001 | |
| 3 | | | 000 | 0001 | 0001 | 0001 | 0001 | |
| 4 | | | | 0000 | 00001 | 00001 | 00001 | ... |
| 5 | | | | | 00000 | 000001 | 000001 | |
| 6 | | | | | | 000000 | 0000001 | |
| 7 | | | | | | | 0000000 | |
| 8 | | | | | | | | |
| 9 | | | | | | | | |
| ... | | | | | | | | |

FIG. 12A

| val | VLD table [0] | VLD table [1] | VLD table [2] | VLD table [3] | VLD table [4] | VLD table [5] |
|---|---|---|---|---|---|---|
| 0 | 1 | 10 | 100 | 1000 | 10000 | 10 |
| 1 | 01 | 11 | 101 | 1001 | 10001 | 11 |
| 2 | 001 | 010 | 110 | 1010 | 10010 | 010 |
| 3 | 0001 | 011 | 111 | 1011 | 10011 | 011 |
| 4 | 00001 | 0010 | 0100 | 1100 | 10100 | 0010 |
| 5 | 000001 | 0011 | 0101 | 1101 | 10101 | 0011 |
| 6 | 0000001 | 00010 | 0110 | 1110 | 10110 | 00010 |
| 7 | 00000001 | 00011 | 0111 | 1111 | 10111 | 00011 |
| 8 | 000000001 | 000010 | 00100 | 01000 | 11000 | 000010 |
| 9 | 0000000001 | 000011 | 00101 | 01001 | 11001 | 000011 |
| 10 | 00000000001 | 0000010 | 00110 | 01010 | 11010 | 0000010 |
| 11 | 000000000001 | 0000011 | 00111 | 01011 | 11011 | 0000011 |
| 12 | 0000000000001 | 00000010 | 000100 | 01100 | 11100 | 00000010 |
| 13 | 00000000000001 | 00000011 | 000101 | 01101 | 11101 | 00000011 |
| ... | ... | ... | ... | ... | ... | ... |

| val | VLD table [6] | VLD table [7] | VLD table [8] | VLD table [9] | VLD table [10] |
|---|---|---|---|---|---|
| 0 | 100 | 1000 | 1 | 100 | 1 |
| 1 | 101 | 1001 | 01 | 1010 | 010 |
| 2 | 110 | 1010 | 00 | 1011 | 011 |
| 3 | 111 | 1011 |  | 11000 | 00100 |
| 4 | 0100 | 1100 |  | 11001 | 00101 |
| 5 | 0101 | 1101 |  | 11010 | 00110 |
| 6 | 0110 | 1110 |  | 11011 | 00111 |
| 7 | 0111 | 1111 |  | 11100 | 0001000 |
| 8 | 00100 | 01000 |  | 11101 | 0001001 |
| 9 | 00101 | 01001 |  | 11110 | 0001010 |
| 10 | 00110 | 01010 |  | 11111 | 0001011 |
| 11 | 00111 | 01011 |  | 010000 | 0001100 |
| 12 | 000100 | 01100 |  | 010001 | 0001101 |
| 13 | 000101 | 01101 |  | 010010 | 0001110 |
| ... | ... | ... | ... | ... | ... |

FIG. 12B

| DS | Symbol | val |
|----|--------|-----|
| 0  | s1     | 0   |
| 2  | s2     | 1   |
| 1  | s3     | 2   |
| 3  | s4     | 3   |
| 4  | s5     | 4   |
| 5  | s6     | 5   |
| 6  | s7     | 6   |

FIG. 15B

| val | Max Range | | | | | | | |
|---|---|---|---|---|---|---|---|---|
| | 2 | 3 | 4 | 5 | 6 | 7 | 8 | ... |
| 0 | 1 | 1 | 1 | 1 | 1 | 1 | 1 | |
| 1 | 0 | 01 | 01 | 01 | 01 | 01 | 01 | |
| 2 | | 00 | 001 | 001 | 001 | 001 | 001 | |
| 3 | | | 000 | 0001 | 0001 | 0001 | 0001 | |
| 4 | | | | 0000 | 00001 | 00001 | 00001 | ... |
| 5 | | | | | 00000 | 000001 | 000001 | |
| 6 | | | | | | 000000 | 0000001 | |
| 7 | | | | | | | 0000000 | |
| 8 | | | | | | | | |
| 9 | | | | | | | | |
| ... | | | | | | | | |

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 37

| Corresponding standard | Driving frequency |
|---|---|
| MPEG-4 AVC | 500 MHz |
| MPEG-2 | 350 MHz |
| ⋮ | ⋮ |

(a)

(b)

IMAGE CODING METHOD, IMAGE DECODING METHOD, IMAGE CODING APPARATUS, IMAGE DECODING APPARATUS, PROGRAM, AND INTEGRATED CIRUIT

TECHNICAL FIELD

The present invention relates to the field of image coding and image decoding, and particularly relates to methods and systems for variable-length coding and variable-length decoding that is one of entropy coding and entropy decoding methods.

BACKGROUND ART

Recent years have seen an increase in the number of applications for video on demand type services, such as video-conferencing through the Internet, digital video broadcasting, and streaming video content. These applications depend on transmission of video information. These applications require that such video data having a substantial amount of digital data is transmitted through conventional transmission channels having limited bandwidth or recorded on conventional recording media having limited data capacity. Accordingly, in order to transmit the video data using a conventional transmission channel or record the video data onto a conventional recording medium, compression or reduction of the amount of the video data is necessary.

Many video coding standards have been developed for the purpose of compressing video data. Such video coding standards include: International Telecommunication Union Telecommunication Standardization Sector (ITU-T) Standard denoted as H. 26x; and International Organization for Standardization/International Electrotechnical Commission (ISO/IEC) Standard denoted as MPEG-x, for example. The latest and most advanced video coding standard to date is a standard denoted as H.264/AVC or MPEG-4 AVC (see Non-Patent Literature (NPL) 1).

In H.264/AVC Standard, information is compressed by: predicting an image signal based on an image signal that has already been coded and decoded; and coding prediction information and a residual signal which is obtained by transforming and quantizing a residual signal between an input image signal and the predicted image signal. In the prediction of the image signal, two reference picture lists L0 and L1 are used as information for identifying a picture that has already been coded and decoded (reference picture). As information for identifying the reference picture, the following are used: first information for identifying which one of the two reference picture lists L0 and L1 should be used; and second information for identifying the reference picture. For example, FIG. 18 shows a variable-length coding unit which variable-length codes the above first information and the second information, and FIG. 19 shows a variable-length decoding unit which variable-length decodes the first and second information.

CITATION LIST

Non Patent Literature

[NPL 1] ISO/IEC 14496-10 "MPEG-4 PART 10 Advanced Video Coding"

SUMMARY

However, there is a problem that, when the first information and the second information are used as in the above conventional method, coding efficiency decreases because of the increase in the amount of information.

The present invention has been conceived in view of the above problem in the conventional technique, and has an object to provide an image coding method and an image decoding method through which coding efficiency can be increased by reducing the amount of information for identifying the reference picture list and the reference picture.

An image coding method according to an aspect of the present invention is for coding an image. Specifically, the image coding method includes: obtaining first information and second information from a current signal to be coded, the first information identifying at least one reference picture list used in inter prediction of the image out of a plurality of reference picture lists, the second information identifying at least one reference picture used in the inter prediction of the image out of reference pictures included in the at least one reference picture list identified by the first information; mixing the first information and the second information to generate a mixed signal; selecting a variable-length coding table according to a maximum variation range of the mixed signal; and variable-length coding the mixed signal using the selected variable-length coding table.

As described above, by selecting an appropriate variable-length coding table according to the maximum variation range of the mixed signal, a coding amount of the first information and the second information can be reduced.

Furthermore, the variable-length coding table may hold a plurality of possible values of the mixed signal in association with a plurality of codes. The plurality of codes may include two longest codes each having a different value in a least significant digit.

Furthermore, in the selecting, the variable-length coding table may be selected according to the maximum variation range which is a total number of combinations of reference pictures (i) in a case where one of the reference pictures registered in one of a first picture list and a second picture list is used and (ii) in a case where one of the reference pictures registered in each of the first picture list and the second picture list is used.

As an example, the number n1 of registration indices in the first picture list and the number n2 of registration indices in the second picture list may be obtained from the current signal, and the variable-length coding table may be selected according to the maximum variation range calculated by n1+n2+(n1×n2).

As another example, when the reference pictures registered in the first picture list and the reference pictures registered in the second picture list are the same, the number n1 of registration indices in the first picture list may be obtained from the current signal, and the variable-length coding table may be selected according to the maximum variation range calculated by n1+(n1×n1).

Furthermore, the image coding method may further include updating the variable-length coding table used in the variable-length coding. In the updating, the association between the codes and the possible values of the mixed signal may be changed to shorten the code length of a code associated with the value of the mixed signal.

An image decoding method according to an aspect of the present invention is for decoding a coded image. Specifically, the image decoding method includes: obtaining a coded mixed signal which is a mixed signal that has been coded; selecting a variable-length decoding table according to a maximum variation range of the mixed signal; variable-length decoding the coded mixed signal using the selected variable-length decoding table; and dividing the decoded mixed signal into first information and second information, the first information identifying at least one reference picture list used in inter prediction of the image out of a plurality of reference picture lists, and the second information identifying at least one reference picture used in the inter prediction of the image out of reference pictures included in the at least one reference picture list identified by the first information.

An image coding apparatus according to an aspect of the present invention codes an image. Specifically, the image coding apparatus includes: an obtaining unit configured to obtain first information and second information from a current signal to be coded, the first information identifying at least one reference picture list used in inter prediction of the image out of a plurality of reference picture lists, and the second information identifying at least one reference picture used in the inter prediction of the image out of reference pictures included in the at least one reference picture list identified by the first information; a mixed signal generating unit configured to mix the first information and the second information obtained by the obtaining unit to generate a mixed signal; a table selection unit configured to select a variable-length coding table according to a maximum variation range of the mixed signal generated by the mixed signal generating unit; and a variable-length coding unit configured to variable-length code the mixed signal using the variable-length coding table selected by the table selection unit.

An image decoding apparatus according to an aspect of the present invention decodes a coded image. Specifically, the image decoding apparatus includes: an obtaining unit configured to obtain a coded mixed signal which is a mixed signal that has been coded; a table selection unit configured to select a variable-length decoding table according to a maximum variation range of the mixed signal; a variable-length decoding unit configured to variable-length decode the coded mixed signal using the variable-length decoding table selected by the table selection unit; and a dividing unit configured to divide the decoded mixed signal decoded by the variable-length decoding unit into first information and second information, the first information identifying at least one reference picture list used in inter prediction of the image out of a plurality of reference picture lists, the second information identifying at least one reference picture used in the inter prediction of the image out of reference pictures included in the at least one reference picture list identified by the first information.

A program according to an aspect of the present invention is for causing a computer to code an image. Specifically, the program causes the computer to execute: obtaining first information and second information from a current signal to be coded, the first information identifying at least one reference picture list used in inter prediction of the image out of a plurality of reference picture lists, the second information identifying at least one reference picture used in the inter prediction of the image out of reference pictures included in the at least one reference picture list identified by the first information; mixing the first information and the second information to generate a mixed signal; selecting a variable-length coding table according to a maximum variation range of the mixed signal; and variable-length coding the mixed signal using the selected variable-length coding table.

A program according to another aspect of the present invention is for causing a computer to decode a coded image. Specifically, the program causes the computer to execute: obtaining a coded mixed signal which is a mixed signal that has been coded; selecting a variable-length decoding table according to a maximum variation range of the mixed signal; variable-length decoding the coded mixed signal using the selected variable-length decoding table; and dividing the decoded mixed signal into first information and second information, the first information identifying at least one reference picture list used in inter prediction of the image out of a plurality of reference picture lists, the second information identifying at least one reference picture used in the inter prediction of the image out of reference pictures included in the at least one reference picture list identified by the first information.

An integrated circuit according to an aspect of the present invention codes an image. Specifically, the integrated circuit includes: an obtaining unit configured to obtain first information and second information from a current signal to be coded, the first information identifying at least one reference picture list used in inter prediction of the image out of a plurality of reference picture lists, the second information identifying at least one reference picture used in the inter prediction of the image out of reference pictures included in the at least one reference picture list identified by the first information; a mixed signal generating unit configured to mix the first information and the second information obtained by the obtaining unit to generate a mixed signal; a table selection unit configured to select a variable-length coding table according to a maximum variation range of the mixed signal generated by the mixed signal generating unit; and a variable-length coding unit configured to variable-length code the mixed signal using the variable-length coding table selected by the table selection unit.

An integrated circuit according to another aspect of the present invention decodes a coded image. Specifically, the integrated circuit includes: an obtaining unit configured to obtain a coded mixed signal which is a mixed signal that has been coded; a table selection unit configured to select a variable-length decoding table according to a maximum variation range of the mixed signal; a variable-length decoding unit configured to variable-length decode the coded mixed signal using the variable-length decoding table selected by the table selection unit; and a dividing unit configured to divide the decoded mixed signal decoded by the variable-length decoding unit into first information and second information, the first information identifying at least one reference picture list used in inter prediction of the image out of a plurality of reference picture lists, the second information identifying at least one reference picture used in the inter prediction of the image out of reference pictures included in the at least one reference picture list identified by the first information.

With the image coding method and the image decoding method according to the present invention, it is possible to increase coding efficiency by reducing the amount of the first information and the second information.

BRIEF DESCRIPTION OF DRAWINGS

FIG. 4 is a schematic diagram showing an example of a VLC table group.

FIG. 5A is a schematic diagram showing an example of a current signal sequence.

FIG. 5B is a schematic diagram showing an example of a relationship between an index and a symbol.

FIG. 12A is a schematic diagram showing an example of a VLD table group.

FIG. 12B is a schematic diagram showing an example of a combination of an index and decoded data.

FIG. 15B is a schematic diagram showing an example of combinations in VLD table selection.

Figure 25:
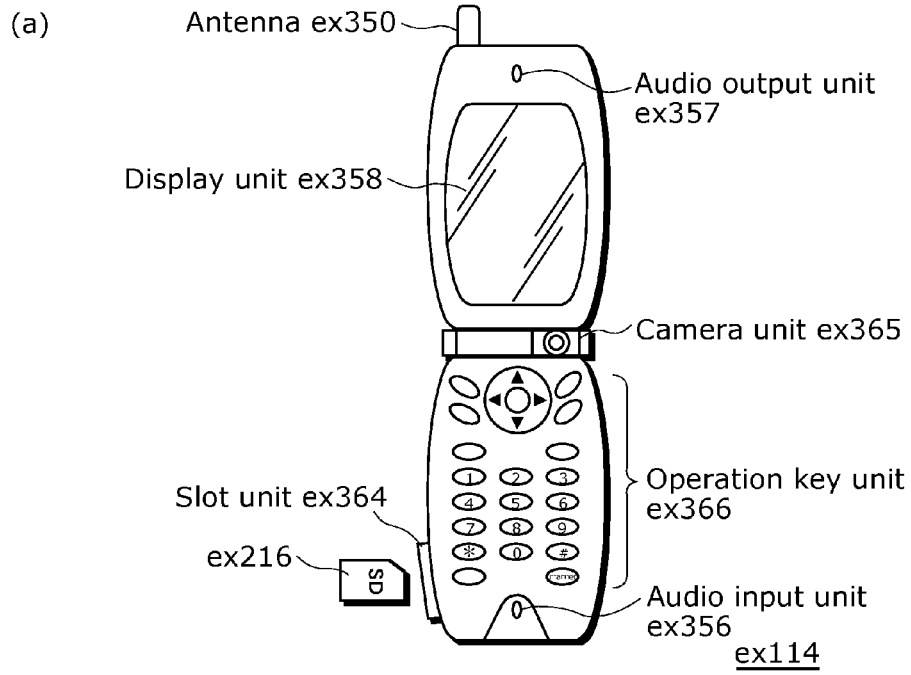
Figure 25:
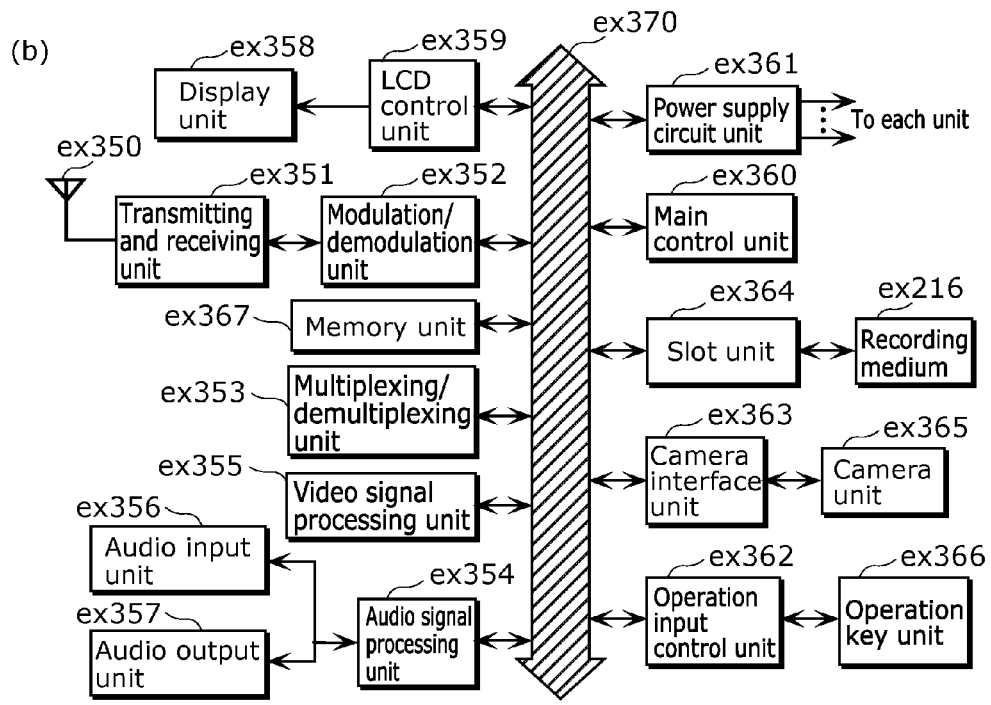

(a) in FIG. 25 shows an example of a cellular phone. (b) in FIG. 25 shows a block diagram showing an example of a configuration of a cellular phone.

FIG. 26 illustrates a structure of multiplexed data.

Figure 27:
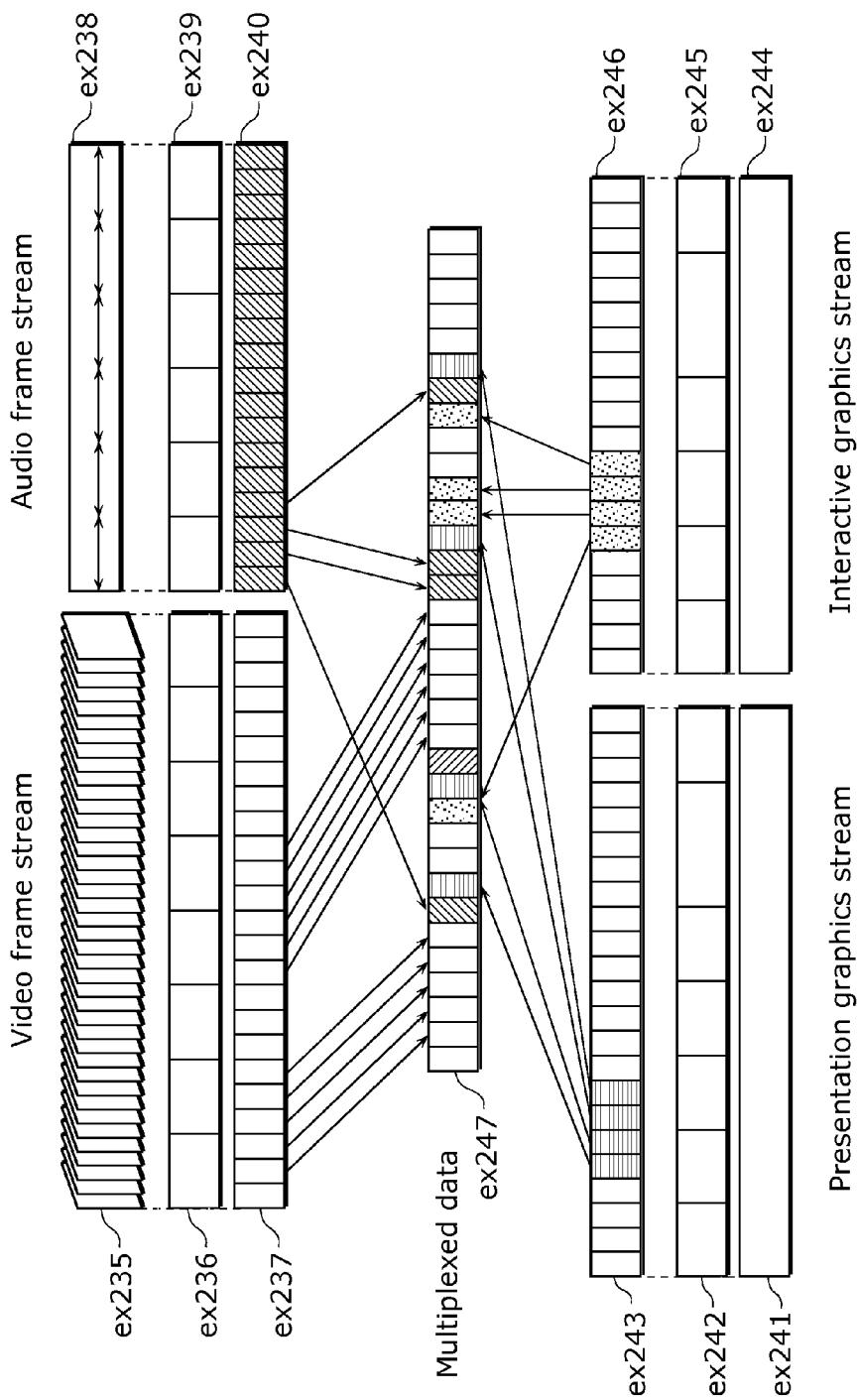

FIG. 27 schematically shows how each stream is multiplexed in multiplexed data.

Figure 28:
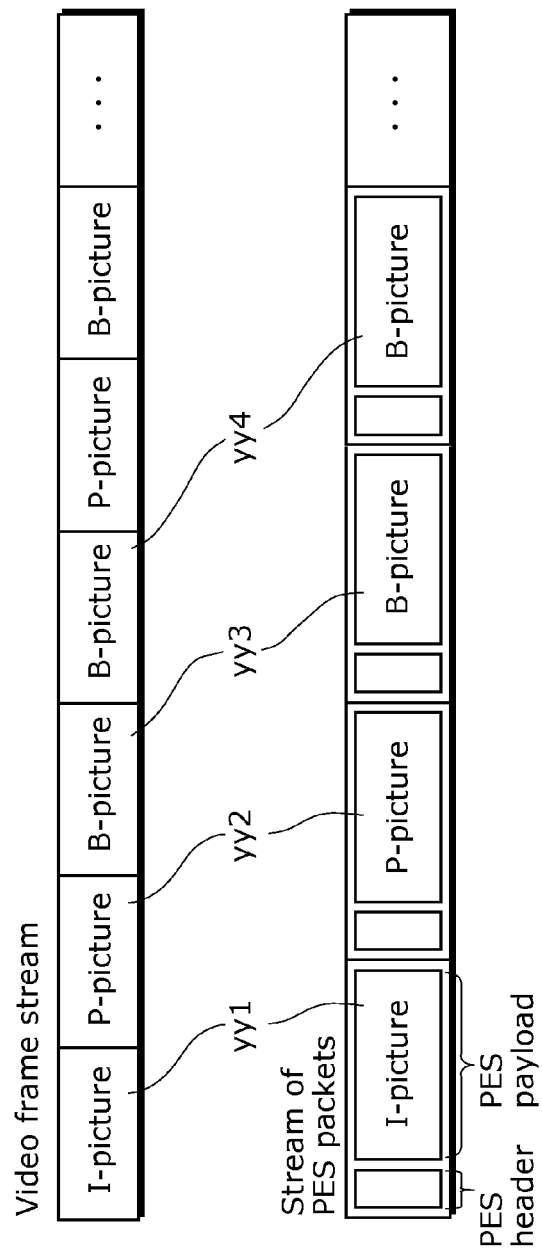

FIG. 28 shows how a video stream is stored in a stream of PES packets in more detail.

Figure 29:
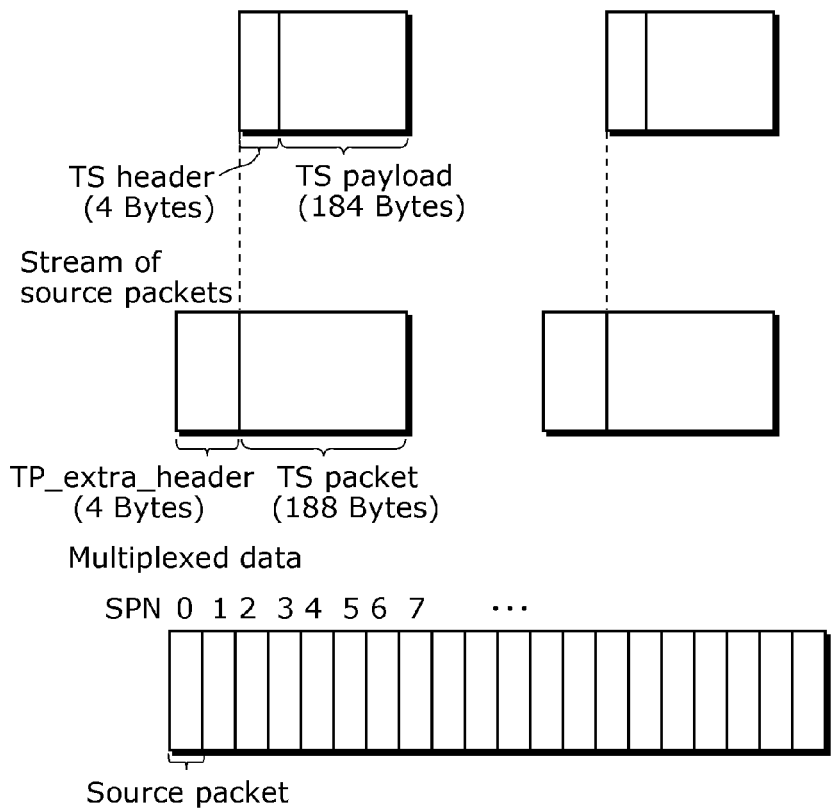

FIG. 29 shows a structure of TS packets and source packets in the multiplexed data.

Figure 30:
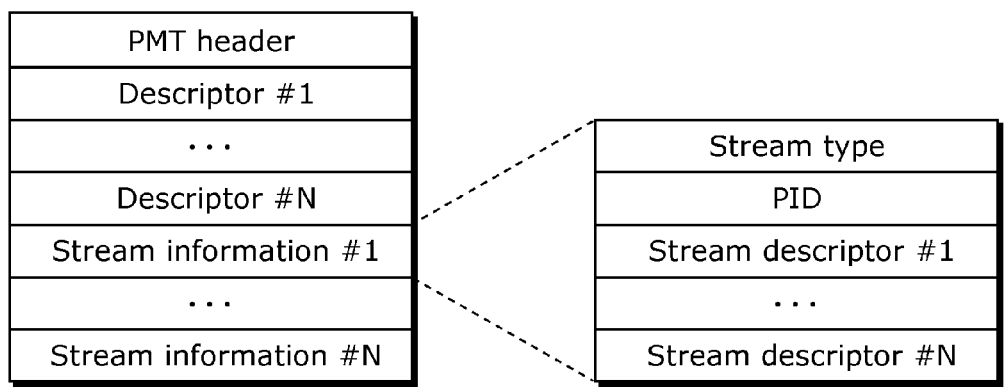

FIG. 30 shows a data structure of a PMT.

Figure 31:
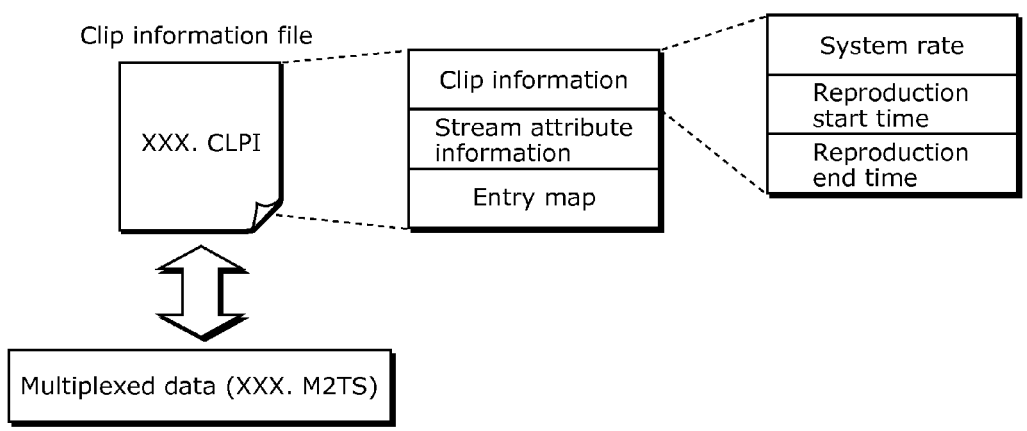

FIG. 31 shows an internal structure of multiplexed data information.

Figure 32:
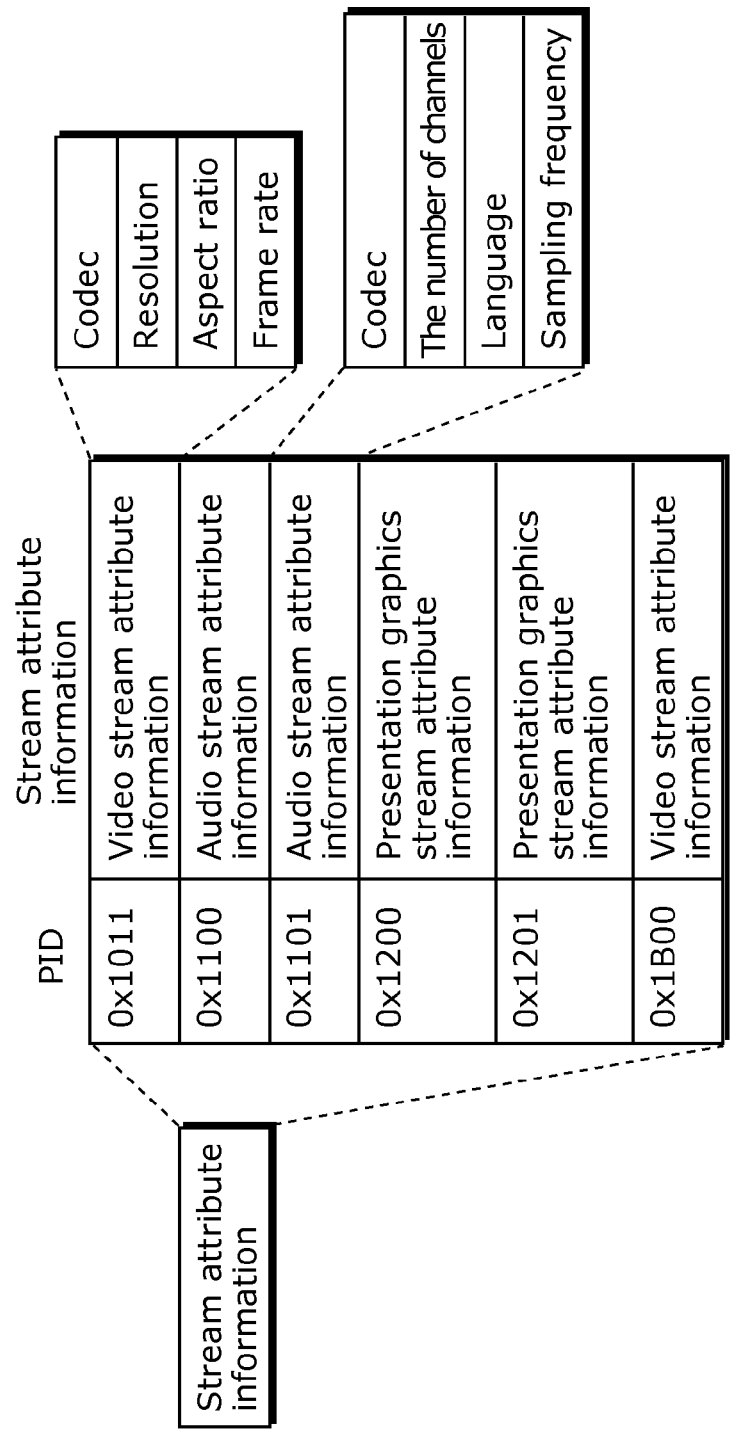

FIG. 32 shows an internal structure of stream attribute information.

Figure 33:
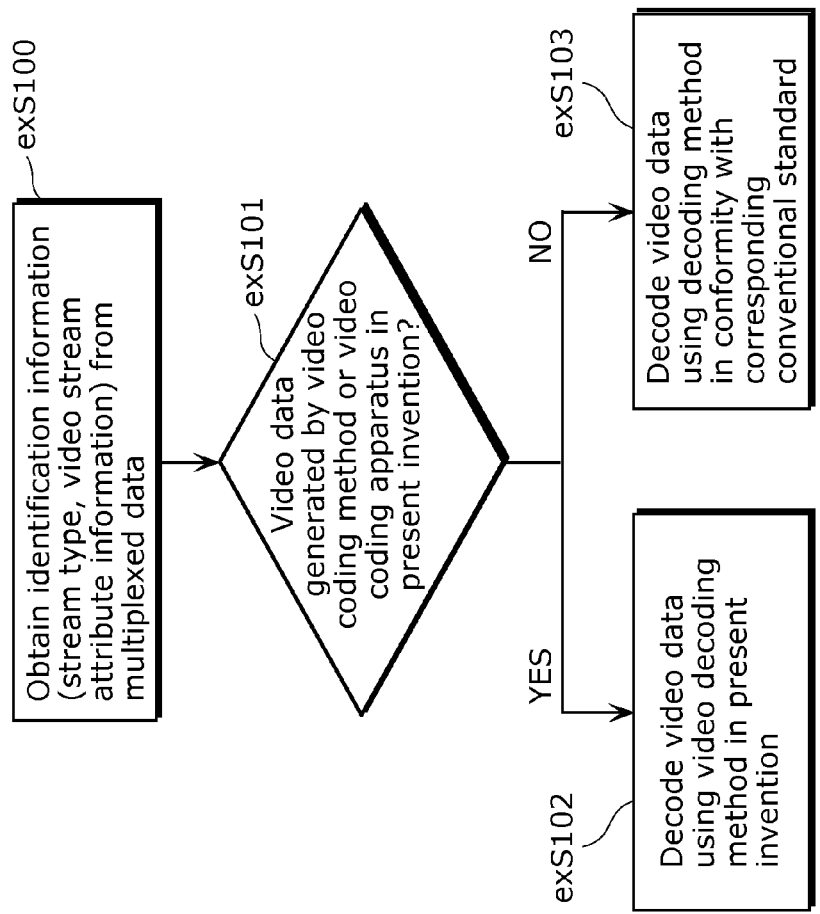

FIG. 33 shows steps for identifying video data.

Figure 34:
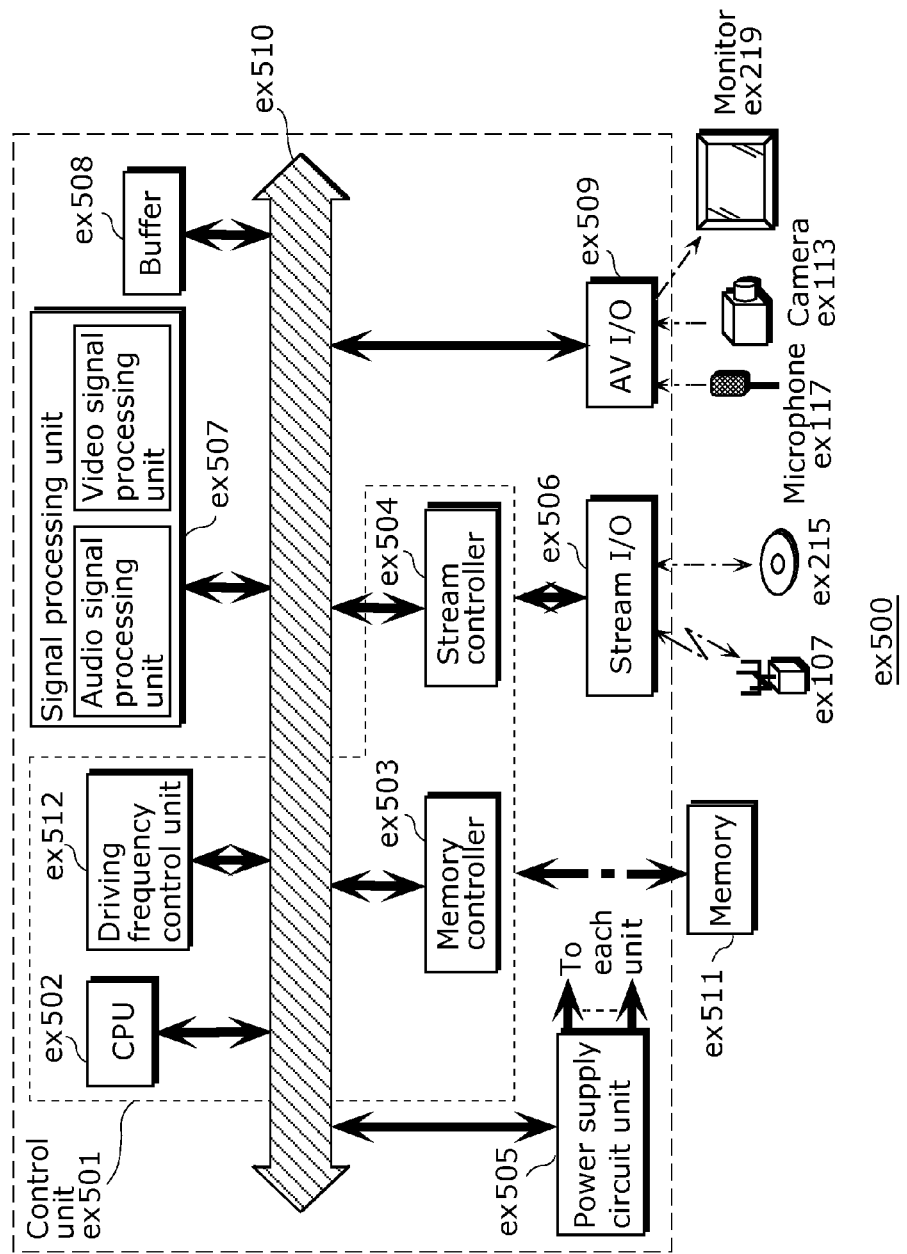

FIG. 34 shows an example of a configuration of an integrated circuit for implementing the moving picture coding method and the moving picture decoding method according to each of the embodiments.

Figure 35:
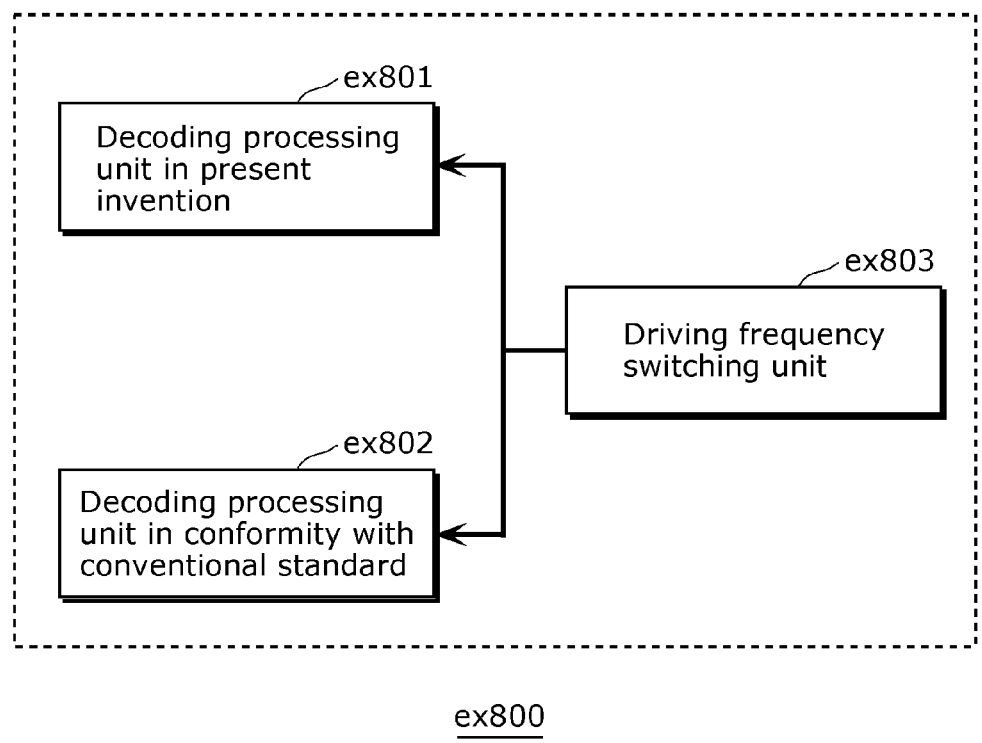

FIG. 35 shows a configuration for switching between driving frequencies.

Figure 36:
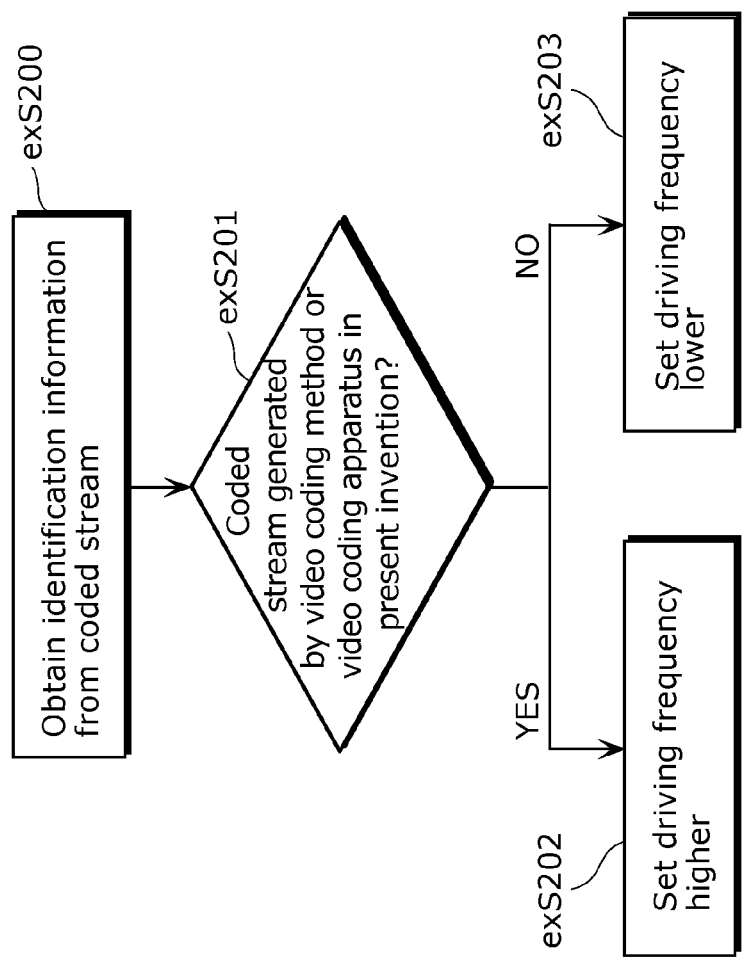

FIG. 36 shows steps for identifying video data and switching between driving frequencies.

FIG. 37 shows an example of a look-up table in which video data standards are associated with driving frequencies.

Figure 38:
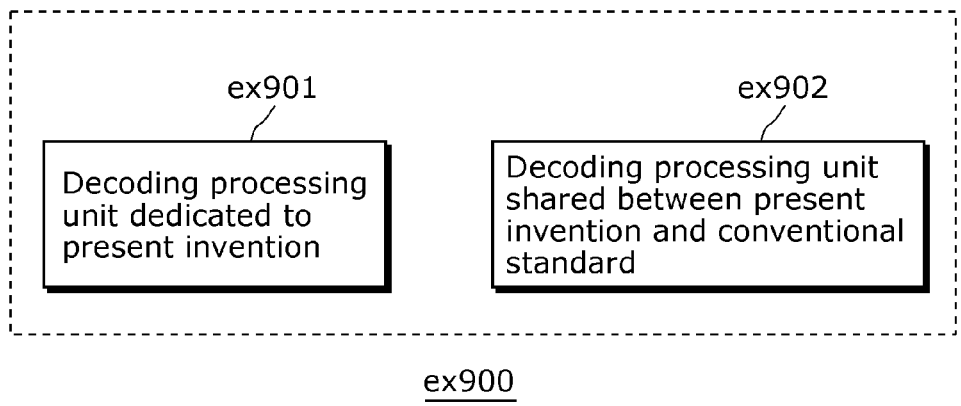
Figure 38:
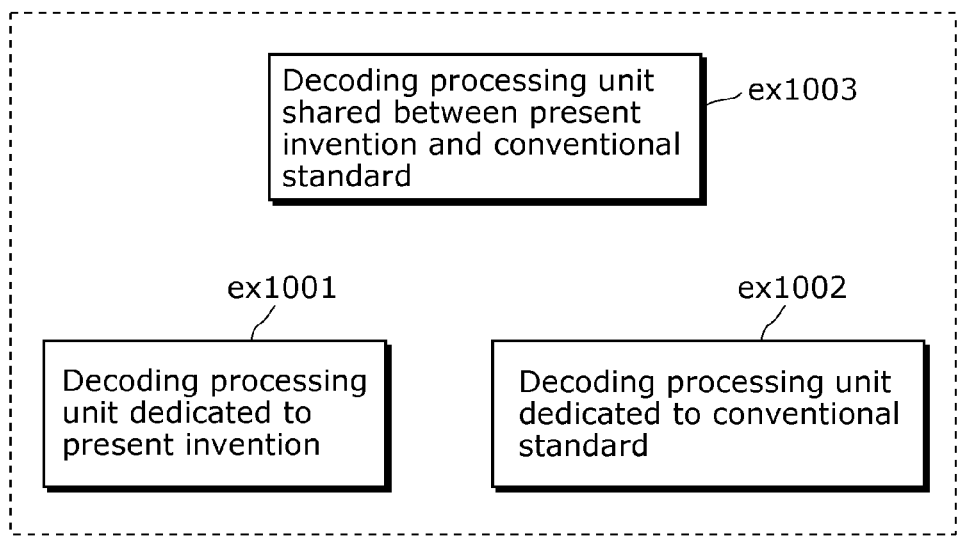

(a) in FIG. 38 is a diagram showing an example of a configuration for sharing a module of a signal processing unit. (b) in FIG. 38 is a diagram showing another example of a configuration for sharing a module of the signal processing unit.

DETAILED DESCRIPTION

[Embodiment 1]

Figure 1A:
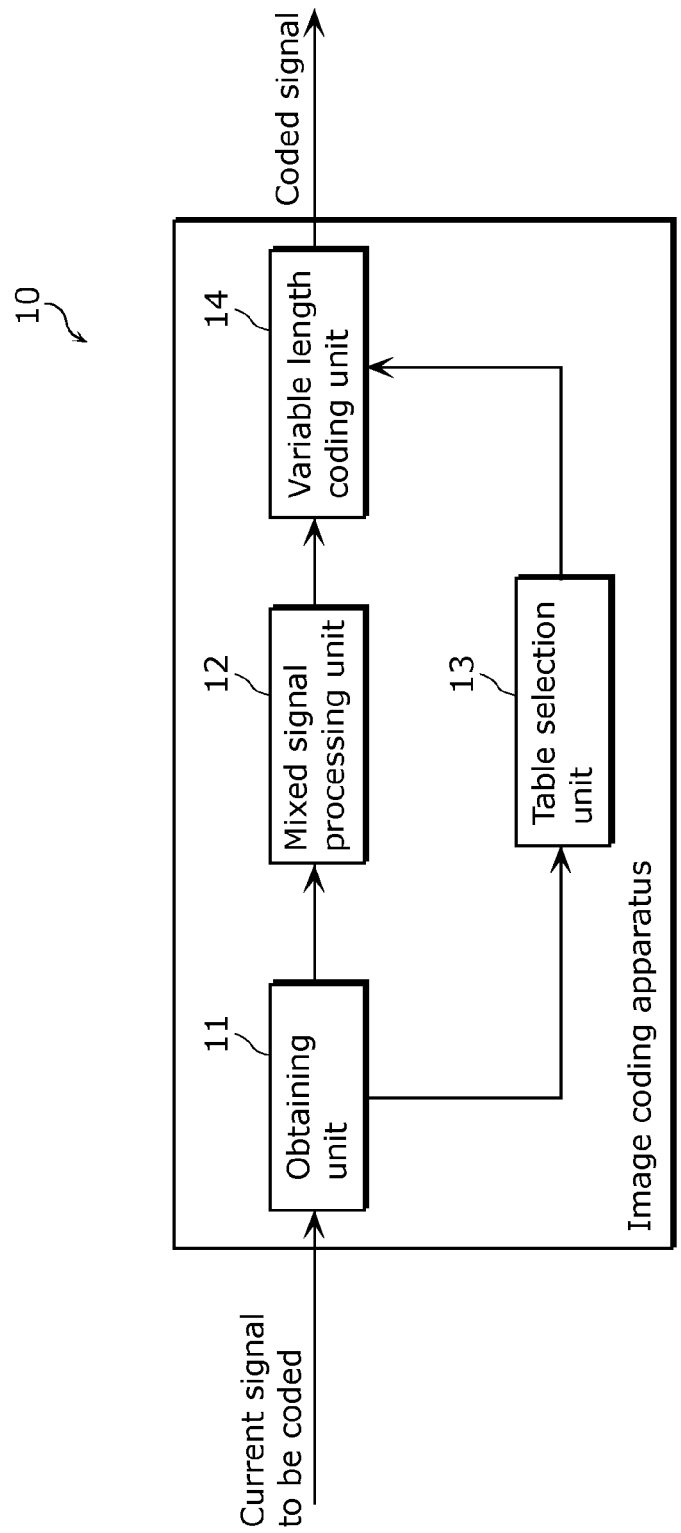
FIG. 1A is a schematic block diagram of an image coding apparatus according to Embodiment 1.
Figure 1B:
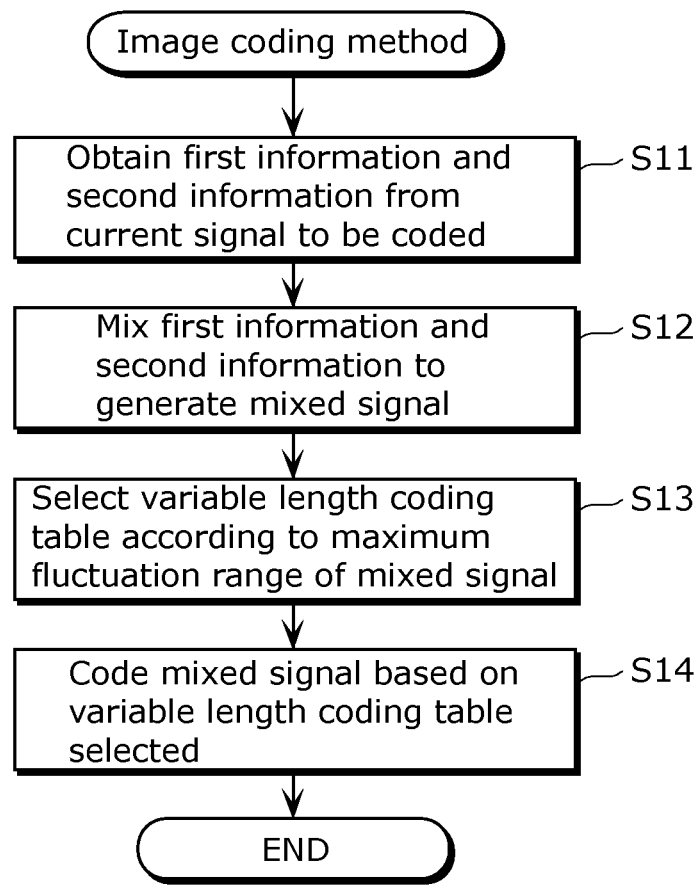
FIG. 1B is a flowchart showing an operation of the image coding apparatus in FIG. 1A.

An image coding apparatus according to Embodiment 1 is described with reference to FIG. 1A and FIG. 1B. FIG. 1A is a schematic block diagram of an image coding apparatus 10 according to Embodiment 1. FIG. 1B is a flowchart showing an operation of the image coding apparatus 10.

The image coding apparatus 10 according to Embodiment 1, as shown in FIG. 1A, includes: an obtaining unit 11; a mixed signal generating unit 12; a table selection unit 13; and a variable-length coding unit 14.

The obtaining unit 11 obtains first information and second information included in a current signal to be coded (S11). The first information in Embodiment 1 identifies at least one reference picture list used in inter prediction of the image out of a plurality of reference picture lists. Furthermore, the second information in Embodiment 2 identifies at least one reference picture used in the inter prediction of the image out of reference pictures included in the at least one reference picture list identified by the first information.

The mixed signal generating unit 12 mixes the first information and the second information obtained by the obtaining unit 11, to generate a mixed signal (S12). Description on how to mix the first information and the second information is given later.

The table selection unit 13 selects a variable-length coding table for use in coding of the mixed signal, out of a plurality of image coding tables preliminarily created, according to a maximum variation range of the mixed signal generated by the mixed signal generating unit 12 (S13). The variable-length coding table which is possible to be selected by the table selection unit 13 holds a plurality of possible values of the mixed signal in association with a plurality of codes. Furthermore, the plurality of codes held in the variable-length coding table includes two longest codes each having a different value in a least significant digit.

The variable-length coding unit 14 variable-length codes the mixed signal using the variable-length coding table selected by the table selection unit 13 (S14).

Figure 2A:
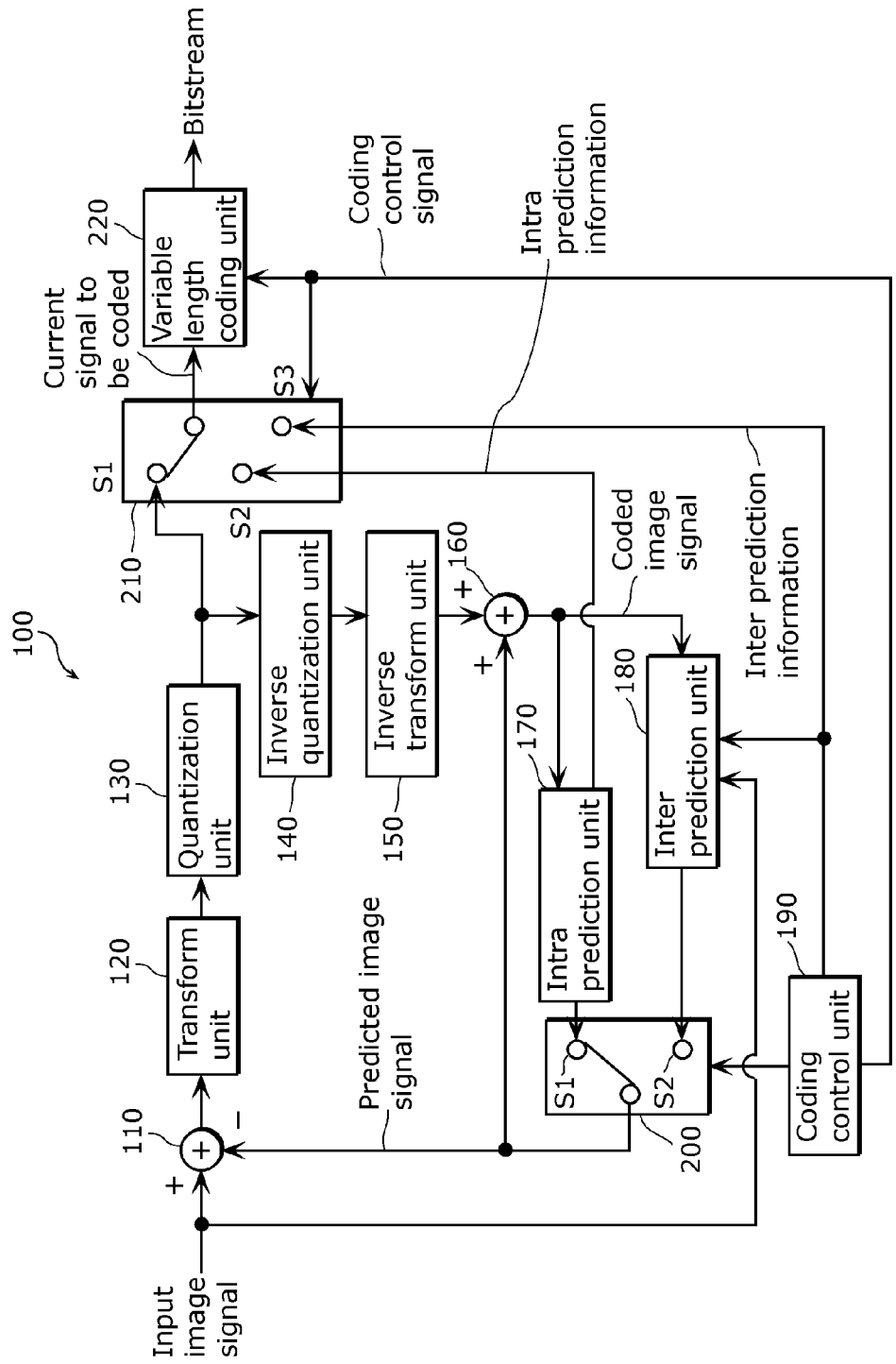
FIG. 2A is a block diagram of an image coding apparatus including a variable-length coding unit according to Embodiment 1.

FIG. 2A is a block diagram of an image coding apparatus in which the variable-length coding method according to the present invention is adopted. As shown in FIG. 2A, an image coding apparatus 100 includes: a subtraction unit 110; a transform unit 120; a quantization unit 130; an inverse quantization unit 140; an inverse transform unit 150; an adder unit 160; a block memory (not shown); a frame memory (not shown); an intra prediction unit 170; an inter prediction unit 180; a coding control unit 190; switches 200 and 210; and a variable-length coding unit 220. It is to be noted that each of the following may internally have a memory: the intra prediction unit 170; the inter prediction unit 180; and the variable-length coding unit 220.

An input image signal is input to the inter prediction unit 180 and the subtraction unit 110. The inter prediction unit 180: generates a predicted image signal from (i) the input image signal and (ii) a decoded image signal which is an image signal that has already been coded, based on reference picture information input from the coding control unit 190; and outputs the generated predicted image signal to S2 of the switch 200. The inter prediction unit 180 further outputs inter prediction information including (i) inter prediction mode information and (ii) reference picture index information which are necessary for generating a predicted image signal, to S3 of the switch 210.

On the other hand, the intra prediction unit 170: generates a predicted image signal from a decoded image signal which is an image signal that has already been coded, by a predetermined method (for example, by stretching a neighboring pixel value in a horizontal direction); and outputs the generated predicted image signal to S1 of the switch 200. The intra prediction unit 170 further outputs intra prediction information including prediction mode information necessary for generating a predicted image signal, to S2 of the switch 210.

Here, the inter prediction mode information is part of inter prediction information indicating a relationship between a current image and a reference picture image (a picture that has already been coded), and, specifically, information indicating a reference picture managed in which reference picture list, out of the reference picture lists that manage reference pictures, is used for prediction. For example, when there are two reference picture lists L0 and L1, the inter prediction mode information indicates the following three kinds of state: only the reference picture list L0 is used; only the reference picture list L1 is used; and both of the reference picture lists L0 and L1 are used.

The switch 200 obtains a result of selection of S1 or S2 from the coding control unit 190, and outputs the selected predicted image signal.

Here, regarding how to determine S1 or S2, a predicted image signal having a smaller one of weighted sums of: a residual value between the predicted image signal and the input image signal; and information necessary for generating a predicted image, may be determined as the predicted image signal. The determined predicted image signal is output to the subtraction unit 110, and further to the adder unit 160 in order to generate an image signal that has already been coded. The coding control unit 190 further outputs a coding control signal indicating a type of the current signal, to S3 of the switch 210 and the variable-length coding unit 220.

The subtraction unit 110 performs subtraction processing on the input image signal and the predicted image signal, and outputs the residual signal to the transform unit 120. The transform unit 120 performs transform processing on the residual signal, and outputs the transformed residual signal to the quantization unit 130. The quantization unit 130 performs quantization processing on transform coefficients resulting from transform processing, and outputs quantized transform coefficient information to S1 of the switch 210 and the inverse quantization unit 140. The inverse quantization unit 140 performs inverse quantization processing on the quantized transform coefficient information, and outputs the transform coefficients to the inverse transform unit 150. The inverse transform unit 150 performs inverse transform processing on the transform coefficients, and outputs the decoded residual image signal to the adder unit 160. The adder unit 160 performs adding processing on the decoded residual image signal and the predicted image signal, and outputs the decoded image signal to the intra prediction unit 170 and the inter prediction unit 180. The switch 210 switches among S1, S2, and S3 according to the type of the signal indicated by the coding control signal, and outputs the current signal to the variable-length coding unit 220. The variable-length coding unit 220 variable-length codes the current signal according to the type of the signal indicated by the coding control signal, and outputs the variable-length coded signal as a bitstream.

Figure 2B:
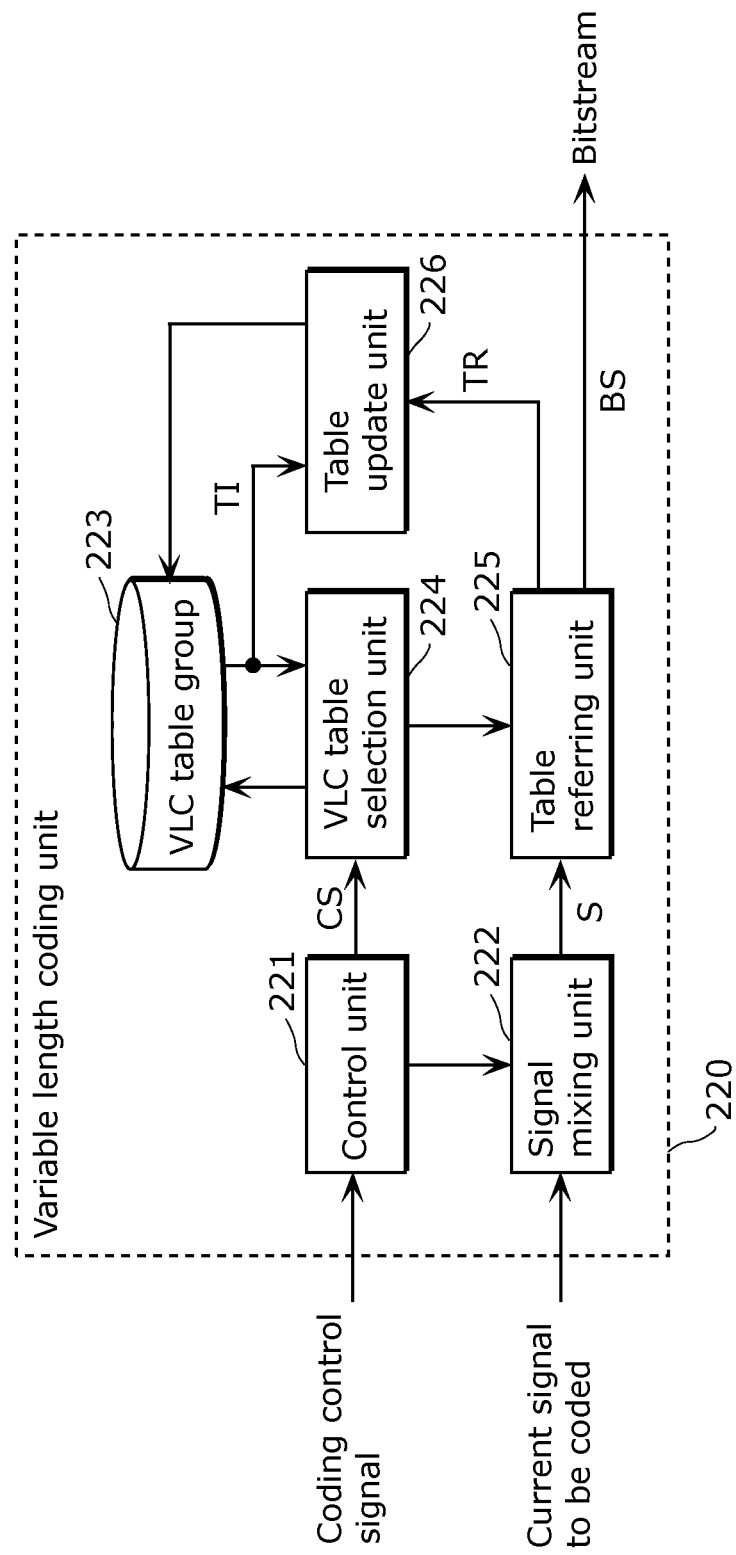
FIG. 2B is a block diagram of the variable-length coding unit according to Embodiment 1.
Figure 3:
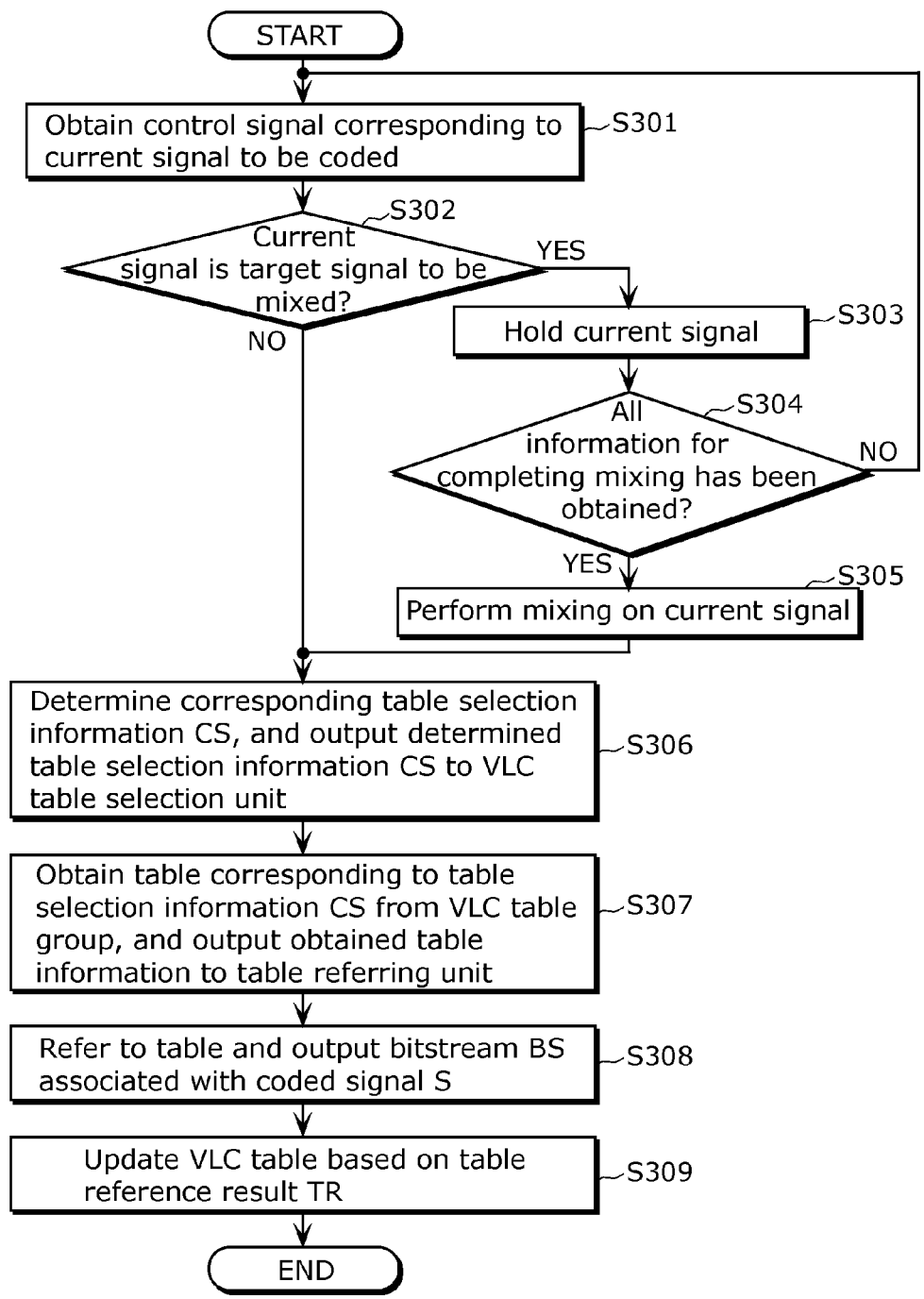
FIG. 3 is a flowchart showing an operation of the variable-length coding unit according to Embodiment 1.

Further details on the variable-length coding unit 220 are described with reference to FIG. 2B and FIG. 3. FIG. 2B is a block diagram of the variable-length coding unit 220. FIG. 3 is a flowchart showing an operational flow of the variable-length coding unit 220.

The variable-length coding unit 220 includes: a control unit 221 (corresponding to the obtaining unit 11 in FIG. 1A); a signal mixing unit 222 (corresponding to the mixed signal generation unit 12 in FIG. 1A); a VLC table group 223, a VLC table selection unit 224 (corresponding to the table selection unit 13 in FIG. 1A); a table reference unit 225 (corresponding to the variable-length coding unit 14 in FIG. 1A); and a table update unit 226. It is to be noted that the signal mixing unit may internally have a memory.

The variable-length coding unit 220 inputs a control signal corresponding to an input current signal, to the control unit 221 (S301). The control unit 221 determines whether or not the current signal is a target signal to be mixed. Then, when the current signal is the target signal (YES in S302), the current signal is input to and held by the signal mixing unit 222 (S303).

On the other hand, when not all the information for completing the mixing has been obtained (NO in S304), the variable-length coding unit 220 repeats the obtaining of the control signal corresponding to the coding control signal, and when all the information for completing the mixing has been obtained (YES in S304), the signal mixing unit 222 performs mixing processing on the current signal, and determines a coded signal S (S305). It is to be noted that when the current signal is not a target signal to be mixed (NO in S302), the current signal is determined as the coded signal S as it is.

It is to be noted that a target signal to be mixed herein may be, for example, inter prediction mode information (first information) and reference index information (second information) used for prediction. Each of the above information is information related to inter prediction coding. Specifically, the inter prediction mode information indicates whether only one of reference picture lists is used or both of the reference picture lists are used. Furthermore, the reference index information is index information (number) indicating at least one picture that is actually referred to in the at least one reference picture list designated by the inter prediction mode.

The control unit 221 further determines table selection information CS corresponding to the current signal, and outputs the determined table selection information CS to the VLC table selection unit 224 (S306). The VLC table selection unit 224 obtains table information TI corresponding to the table selection information CS from the VLC table group 223, and outputs the obtained table information to the table reference unit 225 (S307). Furthermore, the VLC table selection unit 224 outputs the corresponding table information TI to the table update unit.

The table reference unit 225 retrieves a code associated with the coded signal S input from the VLC table indicated in the obtained table information TI, and outputs the code as a bitstream BS (S308). Here, the table reference unit 225 outputs a table reference result TR (position in the table used for obtaining the bitstream BS) to the table update unit 226. The table update unit 226 updates the used VLC table based on the table reference result TR, and performs update processing on the VLC table group 223 (S309).

Figure 5C:
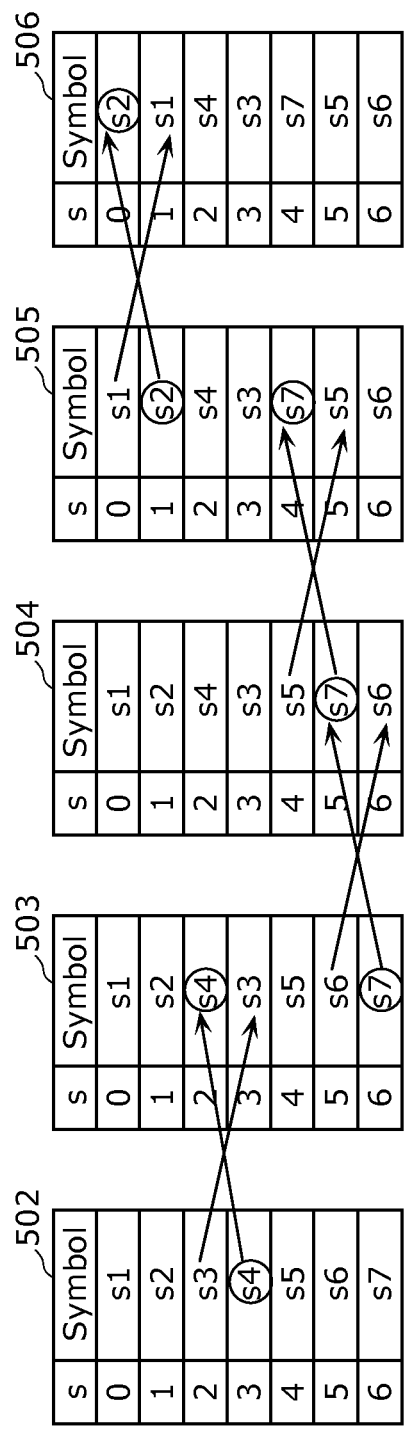
FIG. 5C is a schematic diagram showing an example of a flow of table update.

The following describes how to update the VLC table, with reference to FIG. 4 and FIGS. 5A to 5C. FIG. 4 shows an example of the VLC table group. FIG. 5A shows an example of a coded signal sequence. FIG. 5B shows an example of an association table associating input signals (coded signals) with symbols. FIG. 5C shows a schematic diagram showing how the association table is updated.

As shown in FIG. 4, an association table associating a plurality of codes (bitstreams) with vals (current signal sequences) is stored in the VLC table group. FIG. 5A is an example of a coded signal sequence input to the variable-length coding unit 220. It is to be noted that which VLC table out of the VLC table group shown in FIG. 4 is used is determined according to a type of the signal, for example. Further details on how to determine will be given later.

The association table 501 shown in FIG. 5B shows an association between the input coded signal S with a symbol index. The symbol indices associated with the coded signal sequences in FIG. 5A are as follows: s4, s7, s7, and s2. FIG. 5C shows an example of the update of the association table when the table is referred to in order of s4, s7, s7, and s2. Since the association table 502, which is in an initial state, has referred to s4, s3 and s4 are switched by shifting s4 upward by one and shifting s3 downward by one. As a result, as shown in the association table 503, the symbol referred to is positioned higher than before. Likewise, when the update is performed on s7, s7, and s2, the association tables are updated as the association tables 504, 505, and 506, in this order.

Updating in the above manner makes the current signal sequence val small with respect to a symbol index which occurs frequently, which allows shortening the code length calculated based on the VLC table. For example, assume a case where the coded signal sequence shown in FIG. 5A is converted into val using the association table 502 in the initial state, and coded using VLCTable[0] shown in FIG. 4. In this case, val is 3, 6, 6, and 1, the code length is 4, 7, 7, and 2, respectively, and the total code length is 20. On the other hand, when the association table 506 after update is used, val is 2, 4, 4, and 0, the code length is 3, 5, 5, and 1, respectively, and the total code length is 14. Furthermore, when the update is performed immediately after the association table is actually referred to, val is 3, 6, 5, and 1, the code length is 4, 7, 6, and 2, respectively, and the total code length is 19. As described above, when signals having a similar tendency occur, it is expected that the code length can be shortened.

In the example in FIGS. 5A to 5C, an example is described in which the symbol index is shifted upward by one in updating. However, this is not the only example. A scheme may be adopted in which a symbol index in a low order in the association table is shifted upward by more than one symbol indices, and the moved more than one symbol indices are shifted downward one by one. With this, when a symbol index with a low occurrence frequency occurs more frequently, a code length can be shortened in a short time period, which increases the coding efficiency.

Furthermore, although the coded signal S and the symbol index shown in FIG. 5B are treated separately herein, the coded signal S may be updated directly as the symbol index. In this case, it is expected that the used memory amount is reduced.

Figure 6:
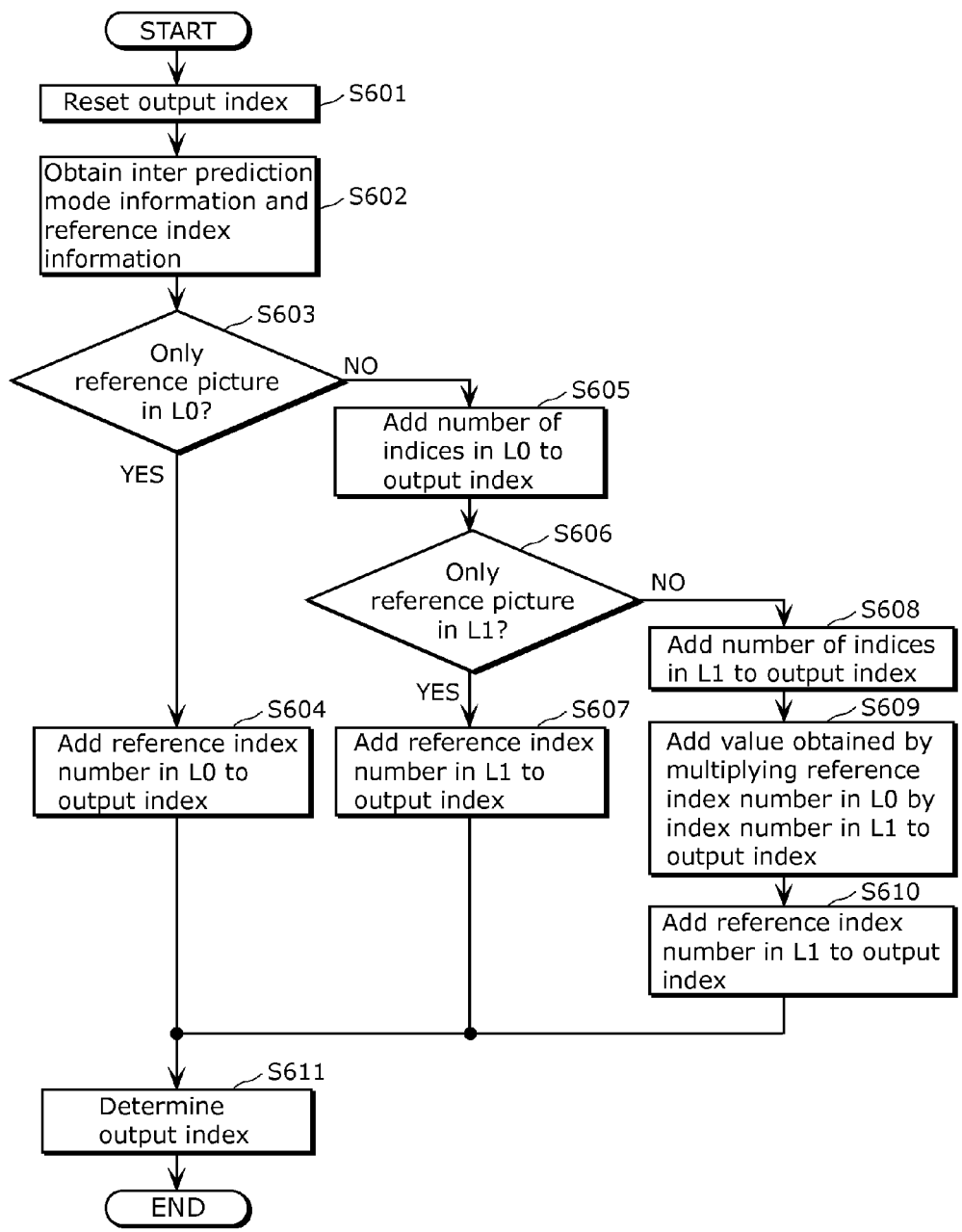
FIG. 6 is a flowchart showing a flow of steps for determining an output index.

Next, with reference to FIG. 6, description is given on how to mix the inter prediction mode information and the reference index information when there are two reference picture lists, that is L0 and L1. First, an output index (coded signal S) that is to be the output is reset (set to 0) (S601).

Next, the signal mixing unit 222 inputs the inter prediction mode information and the reference index information (reference index number and the number of reference indices used in prediction corresponding to the reference picture list) (S602). When the inter prediction mode information indicates that only one of the reference pictures registered in the reference picture list L0 is used for prediction (YES in S603), the reference index number used in the reference picture list L0 is added to the output index (S604). On the other hand, when the inter prediction mode information indicates that not only one of the reference pictures registered in the reference picture list L0 is used (NO in S603), the number of indices in the reference picture list L0 is added to the output index (S605).

Here, the number of indices is a total number of indices in each of the reference picture lists, and is information that has already been determined when coding is performed on a current frame to be coded. This information is input from the control unit 221 to the signal mixing unit 222, and is held by the signal mixing unit 222.

Next, when the inter prediction mode information indicates that only one of the reference pictures registered in the reference picture list L1 is used (YES in S606), the reference index number used in the reference picture list L1 is added to the output index (S607). On the other hand, when the inter prediction mode information indicates that not only one of the reference pictures registered in the reference picture list 1a first picture list and a second picture list is used (NO in S606), the number of indices in the reference picture list L1 is further added to the output index (S608). Furthermore, a value obtained by multiplying the reference index number used in the reference picture list L0 by the number of indices in the reference picture list L1 is added to the output index (S609). Furthermore, the reference index number used in the reference picture list L1 is added to the output index (S610). An output index obtained at the end is determined as the coded signal S (S611), and is output to the table reference unit 225.

This scheme for mixing can be represented by Expression 1 below, for example.

```
if ( PredDir == L0-Pred )
{
TargetIdx = L0Idx;
}
else if( PredDir == L1-Pred )
{
TargetIdx = Number(L0)+L1Idx;
}
else // ( PredDir == Bi-Pred )
{
TargetIdx    =    {Number(L0)    +
Number(L1)}+L0Idx*Number(L1)+L1Idx;
}
```
Expression 1

Here, PredDir indicates an inter prediction mode, that is, information indicating whether: only the reference picture list L0 is used (L0-Pred); only the reference picture list L1 is used (L1-Pred); or both the reference picture lists L0 and L1 are used (Bi-Pred). Furthermore, TargetIdx indicates an output index (coded signal S), Number(L0) indicates the number of indices in the reference picture list L0, Number (L1) indicates the number of indices in the reference picture list L1, L0Idx indicates the reference index number used in the reference picture list L0, and L1Idx indicates the reference index number used in the reference picture list L1.

It is to be noted that in order to reduce division in decoding, when Number(L1) is not expressed as a power of 2, an offset value may be added to Number(L1), to make the obtained number a smallest value expressed as a power of 2 that exceeds Number(L1). In this case, values of TargetIdx are discrete, however, the possible number of types of the value (maximum variation range) does not change, and having a transform table allows using Expression 1, which reduces division in decoding.

Next, description is provided on a flow of processing performed by the VLC table selection unit 224, with reference to FIG. 7 and FIGS. 8A to 8C. The VLC table selection unit 224 obtains from the control unit 221 the number of indices in the reference picture list L0 and the number of indices in the reference picture list L1 (S701). It is to be noted that, as described above, the number of indices in the reference picture list L0 and the number of indices in the reference picture list L1 are information that have already been coded as the header information of the stream, prior to coding of the current signal. Next, the maximum variation range of the coded signal S is calculated based on the obtained reference picture information (S702). Here, the maximum variation range (MaxRange) can be calculated as shown in Expression 2, for example.

MaxRange={Number($L1$)+Number($L0$)}+{Number($L1$)*Number($L0$)}   Expression 2

It is to be noted that in the same manner as in Expression 1, Number(L0) indicates the number of indices in the reference picture list L0, and Number(L1) indicates the number of indices in the reference picture list L1. As described above, the maximum variation range indicates a total number of the possible values of the coded signal S. For example, when the coded signal S has only three types, that is, 0, 2, and 4, the maximum variation range is "3". In other words, the maximum variation range calculated using Expression 2 represents a total number of combinations of reference pictures (i) in a case where one of the reference pictures registered in one of the reference picture list L0 and the reference picture list L1 is used and (ii) in a case where one of the reference pictures registered in each of the first picture list L0 and the second picture list L1 is used.

Next, a VLC table is selected according to the maximum variation range (S703).

Figures 7, 8A:
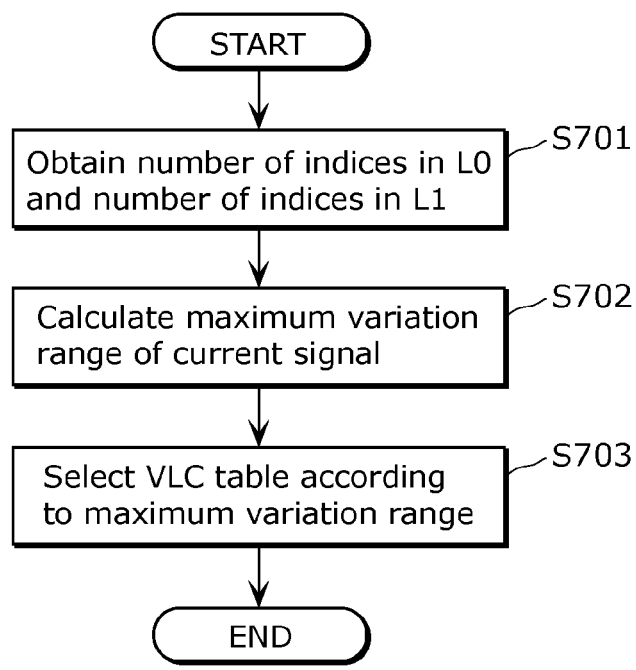
FIG. 7 is a flowchart showing a flow of steps for selecting a VLC table.
FIG. 8A is a schematic diagram showing an example of combinations in VLC table selection.
Figures 8B, 8C:
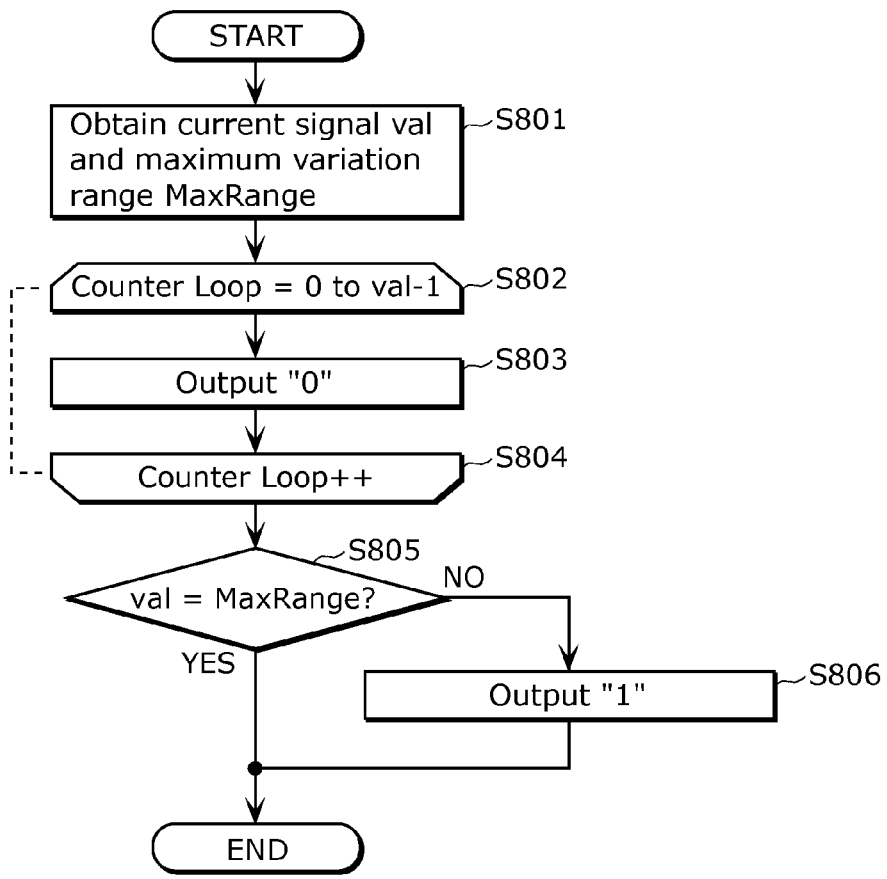
FIG. 8B is a schematic diagram showing an example of combinations in VLC table selection.
FIG. 8C is a flowchart showing a flow of processing of VLC coding method.

FIGS. 8A to 8C each shows an example of a case where a VLC table is selected according to the maximum variation range. For example, FIG. 8A is an example showing an association between the maximum variation ranges (MaxRanges) and the VLC table group shown in FIG. 4. It is to be noted that in the case where the maximum variation range is "2", the VLC table does not have to be used since the current signal can be coded as a simple flag showing 0 or 1. In FIG. 8A, in the case where the maximum variation range is "3", a VLC table with short codes is selected. On the other hand, in the case where the maximum variation range is great, it is sometimes more efficient to select a different VLC table according to the occurrence probability. Therefore, an example is shown in which a different VLC table is used in the case where the maximum variation range is great (FIG. 8A shows an example in which a different VLC table is used in the case where the maximum variation range is greater than or equal to "11").

FIG. 8A shows an example in which a common VLC table is used except for the above cases.

Using such an association reduces switching of the VLC table, which reduces the processing amount. As a result, it is possible to save the amount of memory used to hold the VLC table.

On the other hand, FIG. 8B shows an example of a scheme in which, since the maximum variation range is already known, the code in the VLC table is increased on a bit basis and the least significant bit of the longest code is deleted. For example, when the maximum variation range is "5", codes having the same length (0001, 0000) can be used for the current signal 3 and the current signal 4, respectively. The advantage here is that the coding amount can be saved in a portion having the longest code length. Furthermore, the scheme shown in FIG. 8B can be changed to a code by a scheme of Expression 3.

```
for( counter=0; counter<val; counter++ )
{
output_code("0");
}
if ( val != MaxRange )
{
output_code("1");
}
```
Expression 3

FIG. 8C is a flowchart showing a flow of processing of Expression 3. First, the above-obtained current signal val and the maximum variation range MaxRange are obtained (S801). Next, repetition processing is performed in a time period during which the counter has a value from 0 to val −1 (processing between S802 and S804). As the repetition processing, processing to output a code "0" is performed (S803). Then, the counter is incremented by one (S804), and the processing goes back to S802. It is to be noted that the repetition processing is not performed when val=0. After all the repetition processing is completed, a determination is made on whether or not the value of val is equal to the value of MaxRange. Then, when the values do not match (NO in S805), a code "1" is output and the processing is ended (S806). Furthermore, when the value of val and the value of MaxRange match (YES in S806), the processing is ended as it is (S806). The bitstream output as above is the bitstream associated with the current signal val.

It is to be noted that the above scheme of table combination is just an example and is not the only example.

It is to be noted that the initial table or the update table may be described in a header portion of the stream (header portion in Embodiment 3).

Although the present embodiment has been described based on the case where there are two types of reference picture list, the present invention is not limited to the above. When there are three or more types of reference picture list, the coding amount of the inter prediction mode information and the reference index information further increases, and a further reduction in coding amount is expected by an application of the present invention.

It is to be noted that, as to a scheme for determining table selection information CS based on a signal type included in the coding control signal using the control unit 221, it may be predetermined for which type information a VLC table is used in the coding method and the decoding method. With this, a VLC table according to the signal type can be used.

Furthermore, it may be determined to use the same VLC table for different type information (for example, information necessary for inter prediction and information necessary for intra prediction which are used for generating a predicted image). There is a case where the current signals take similar distribution even when the type of signal is different. In this case, sharing a VLC table allows reducing the memory amount necessary for holding the VLC table while maintaining coding efficiency.

[Embodiment 2]

Figure 9A:
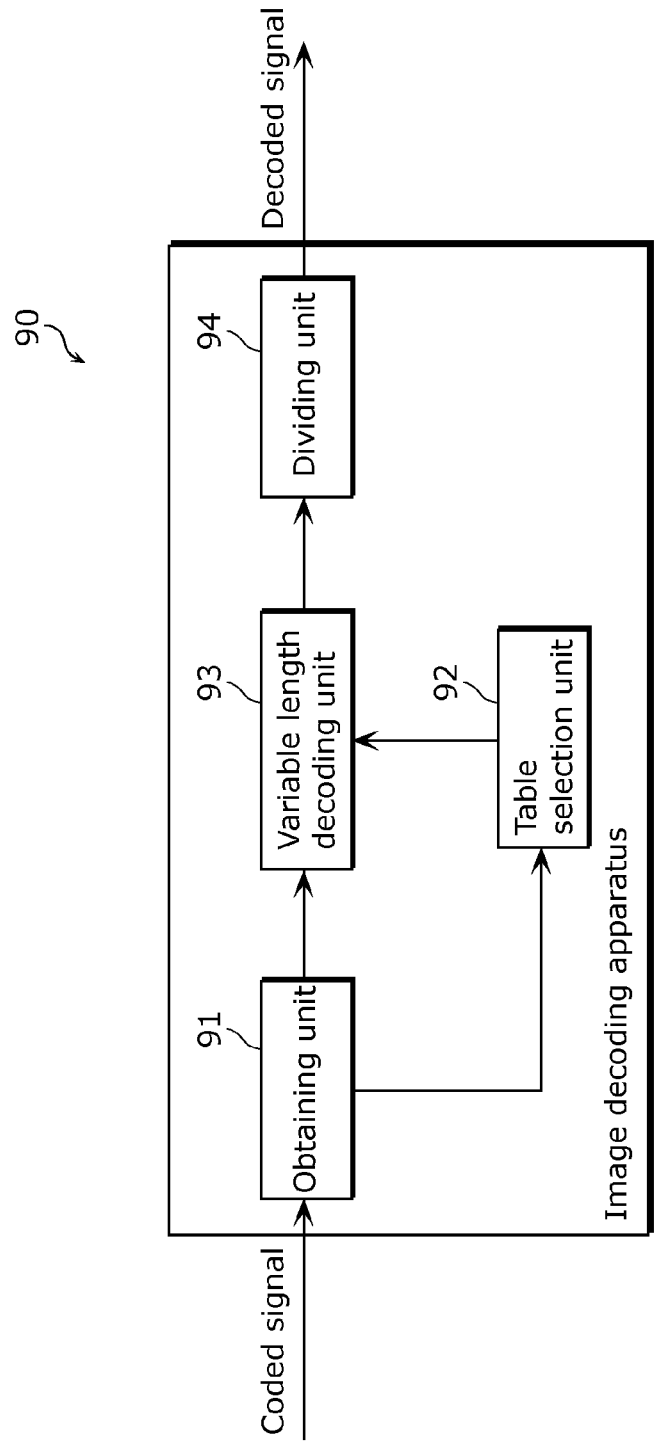
FIG. 9A is a schematic block diagram of an image decoding apparatus according to Embodiment 2.
Figure 9B:
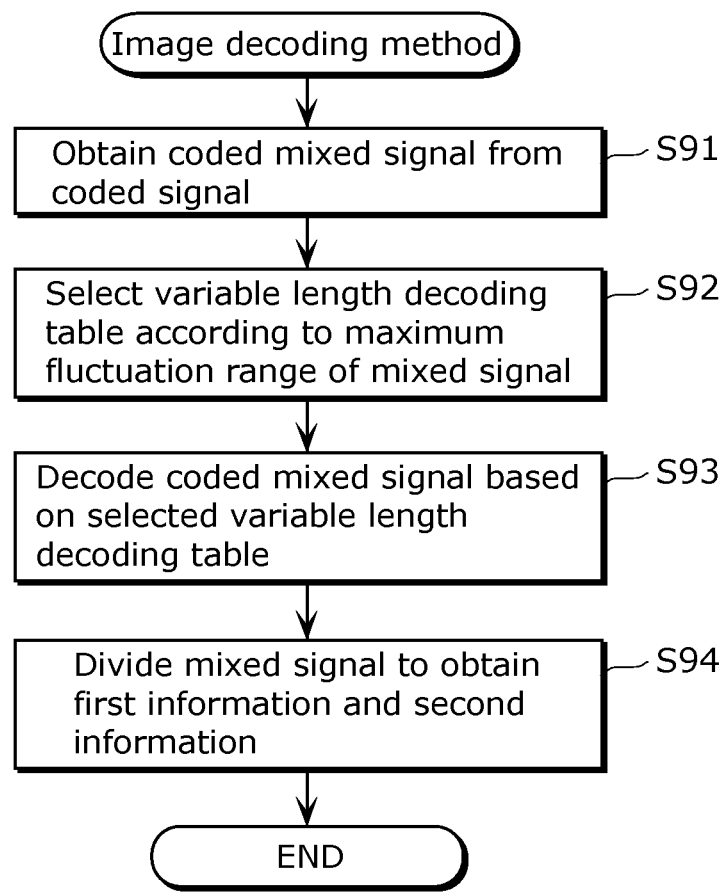
FIG. 9B is a flowchart showing an operation of the image decoding apparatus in FIG. 9A.

An image decoding apparatus according to Embodiment 2 is described with reference to FIG. 9A and FIG. 9B. FIG. 9A is a schematic block diagram of an image decoding apparatus 90 according to Embodiment 2. FIG. 9B is a flowchart showing an operation of the image decoding apparatus 90.

The image decoding apparatus 90 according to Embodiment 2 includes an obtaining unit 91, a table selection unit 92, a variable-length decoding unit 93, and a division unit 94.

The obtaining unit 91 obtains a coded mixed signal which is a mixed signal that has been coded (S91).

The table selection unit 92 selects a variable-length decoding table for use in decoding of the mixed signal, out of a plurality of image coding tables preliminarily created, according to a maximum variation range of the mixed signal (S92).

The variable-length decoding unit 93 variable-length decodes the coded mixed signal using the variable-length decoding table selected by the table selection unit 92 (S93).

The division unit 94 divides the mixed signal decoded by the variable-length decoding unit 93 into first information and second information (S94).

Figure 10A:
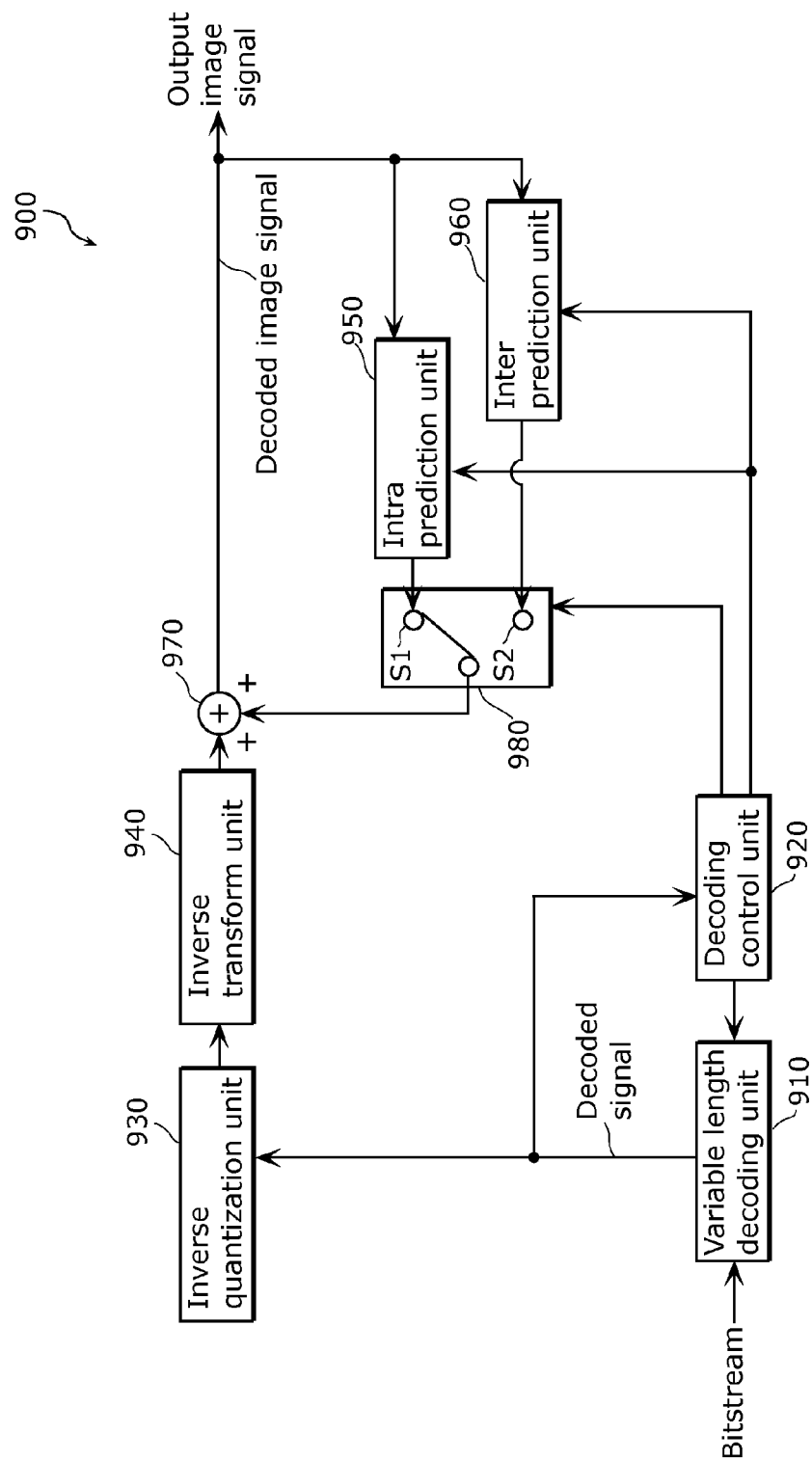
FIG. 10A is a block diagram of an image decoding apparatus including a variable-length decoding unit according to Embodiment 2.

FIG. 10A is a block diagram of an image decoding apparatus in which a variable-length decoding method according to the present invention is adopted. As shown in FIG. 10A, an image decoding apparatus 900 includes: a variable-length decoding unit 910; a decoding control unit 920; an inverse quantization unit 930; an inverse transform unit 940; an intra prediction unit 950; an inter prediction unit 960; an adder unit 970; and a switch 980. It is to be noted that each of the following may internally have a memory: the variable-length coding unit 910; the intra prediction unit 950, and the inter prediction unit 960.

Assume that the input bitstream is generated by the image coding apparatus 100 in which the variable-length coding method according to the present invention is adopted. The input bitstream is input to the variable length decoding unit 910. The variable length decoding unit 910: performs variable-length decoding on the bitstream based on the type information of the signal obtained from the decoding control unit 920; and outputs the decoded signal to the decoding control unit 920 and the inverse quantization unit 930. When the decoded signal is quantized transform coefficients, the decoded signal is inverse quantized by the inverse quantization unit 930, inverse transformed by the inverse transform unit 940, becomes decoded residual image signal, and is output to the adder unit 970. Furthermore, when the decoded signal is predicted-image-generation related information, the decoding control unit 920 outputs the decoded signal to the inter prediction unit 960, the intra prediction unit 950, and the switch 980. The inter prediction unit 960 generates a predicted image signal from a decoded image signal which is an image signal that has already been decoded and predicted-image-generation related information, and outputs the predicted image signal to S2 of the switch 980. On the other hand, the intra prediction unit 950: generates a predicted image signal from a decoded image signal which is an image signal that has already been decoded and predicted-image-generation related information; and outputs the predicted image signal to S1 of the switch 980. The switch 980 switches to one of S1 and S2 based on coding mode information obtained from the coding control unit 920, and outputs the selected predicted image signal to the adder unit 970. The adder unit 970 adds the decoded residual image signal and the predicted image signal, and outputs the obtained signal as a decoded image signal. Furthermore, the decoding control unit 920 outputs to the variable length decoding unit 910 signal type information to be decoded next.

Figure 10B:
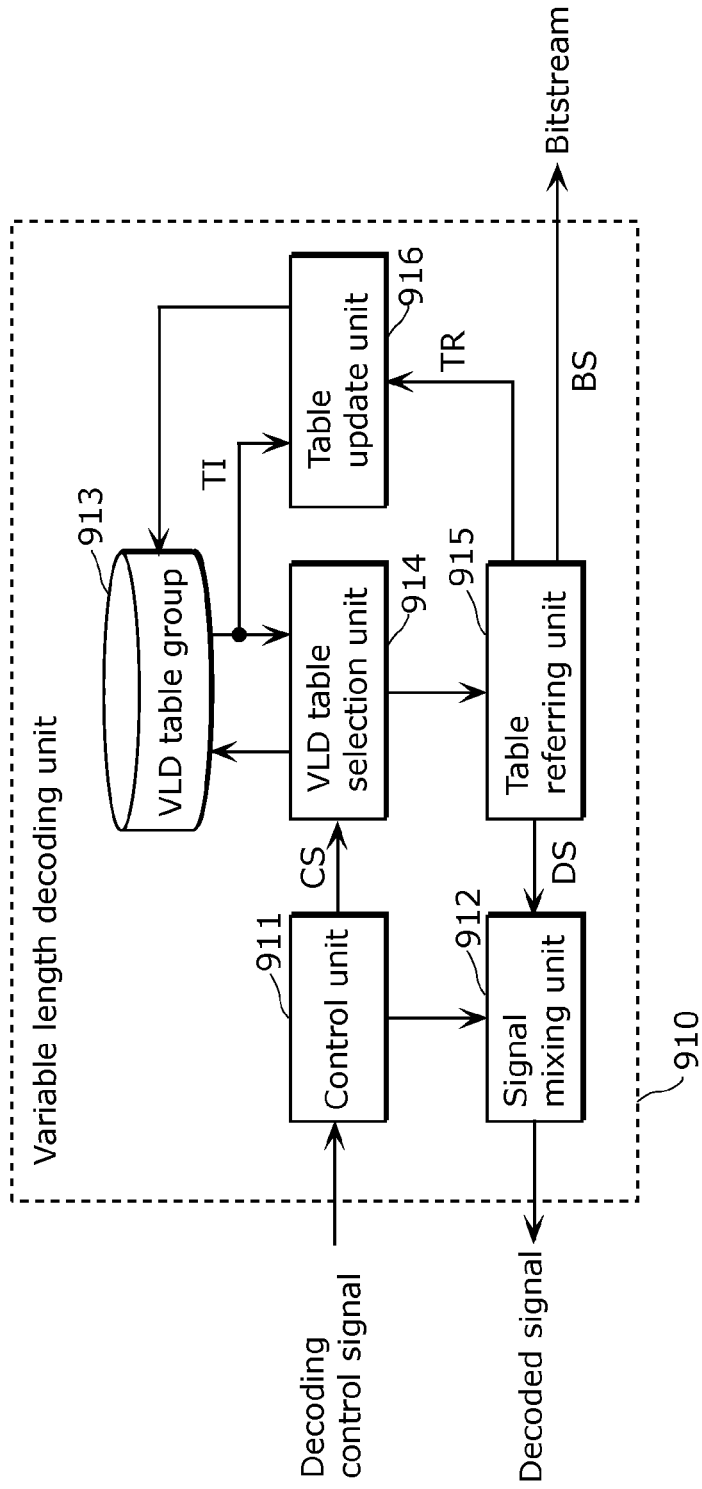
FIG. 10B is a block diagram of the variable-length decoding unit according to Embodiment 2.
Figure 11:
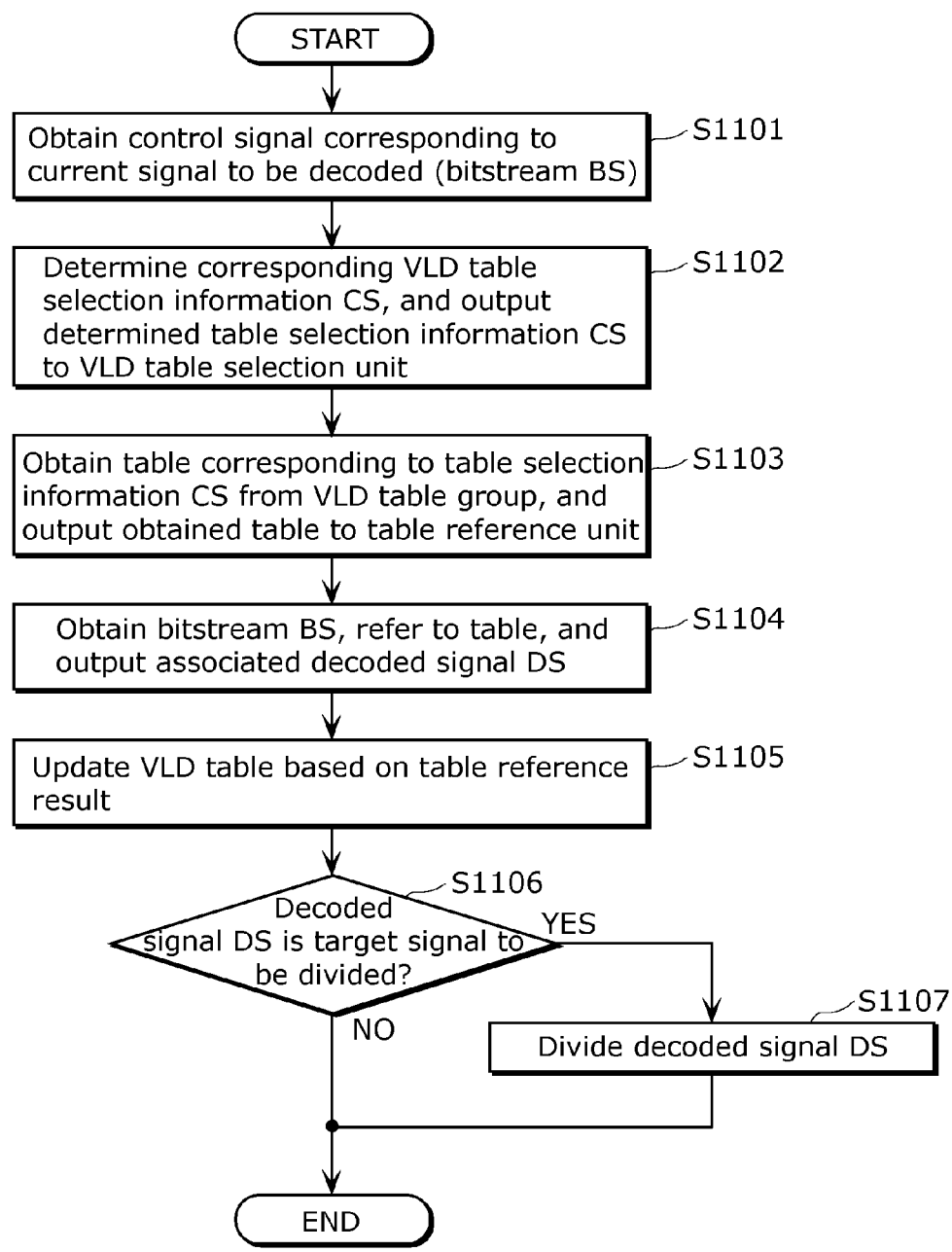
FIG. 11 is a flowchart showing an operation of the variable-length decoding unit according to Embodiment 2.

Further details on the variable-length decoding unit 910 are described with reference to FIG. 10B and FIG. 11. FIG. 10B is a block diagram of the variable-length decoding unit 910. FIG. 11 is a flowchart showing an operation flow of the variable-length decoding unit 910.

The variable-length decoding unit 910 includes: a control unit 911 (corresponding to the obtaining unit 91 in FIG. 9A); a signal division unit 912 (corresponding to the division unit 94 in FIG. 9A); a VLD table group 913; a VLD table selection unit 914 (corresponding to the table selection unit 92 in FIG. 9A); a table reference unit 915 (corresponding to the variable-length decoding unit 93 in FIG. 9A); and a table update unit 916.

The variable-length decoding unit 910 inputs a decoding control signal including the input signal type information to the control unit 911 (S1101). The control unit 911 determines table selection information CS corresponding to the type information, and outputs the determined table selection information CS to the VLD table selection unit 914 (S1102). The VLD table selection unit 914 obtains a VLD table corresponding to the table selection information CS from the VLD table group 913, and outputs the obtained table information TI to the table reference unit 915 (S1103). Furthermore, the VLD table selection unit 914 outputs the corresponding VLD table to the table update unit 916. The table reference unit 915 retrieves a code associated with the bitstream BS from the obtained VLD table, and outputs the code as the decoded signal DS (S1104). Here, the table reference unit 915 outputs a table reference result TR (position in the table used for obtaining decoded signal DS) to the table update unit 916. The table update unit 916 updates the VLD table based on the table reference result TR of the used VLD table (S1105). Next, the control unit 911 determines whether or not the decoded signal DS obtained in association with information of the bitstream to be decoded is a target signal to be divided, based on the signal type information of the decoding control signal.

It is to be noted that a target signal to be divided is a target signal to be mixed in the coding described in Embodiment 1, and may be information obtained by mixing the inter prediction mode information (first information) and the reference index information (second information) used for prediction. Each of the above information is information obtained as information related to inter prediction coding.

When the decoded signal DS is a target signal to be divided (YES in S1106), the signal division unit 912 divides the decoded signal DS (S1107). Further details on how to divide will be described later. On the other hand, when the decoded signal DS is not a target signal to be divided (NO in S1106), the decoded signal DS is output as a decoded signal as it is.

The following describes how to refer to the VLD table, with reference to FIG. 12A and FIG. 12B. FIG. 12A is an example of the VLD table group. As shown in FIG. 12A, an association table associating a plurality of codes (bitstreams) and vals (decoded signals) are stored in the VLD table group. Type information necessary for decoding is obtained, and in the same manner as shown in Embodiment 1, a VLD table corresponding to the type information is extracted from the VLD table group, and a decoded signal DS associated with the bitstream BS is output. For example, when the decoding is performed for VLD table 0, and when the bitstream is "001", a val "2" is output as the decoded signal DS.

Then, the VLD table update processing is performed. It is to be noted that the VLD table update is performed by the same scheme as in the coding method. Complying with the same manner as shown in Embodiment 1, when the width of the update is changed for example, the same scheme as in coding is used to switch the update table in decoding. As described in detail in Embodiment 1, when an intermediate table is used for the update, as shown in FIG. 12B, the value of val in the table reference result is further transformed to a decoded signal DS. For example, when val is "2" as above, the associated decoded signal DS is "1".

Figure 13:
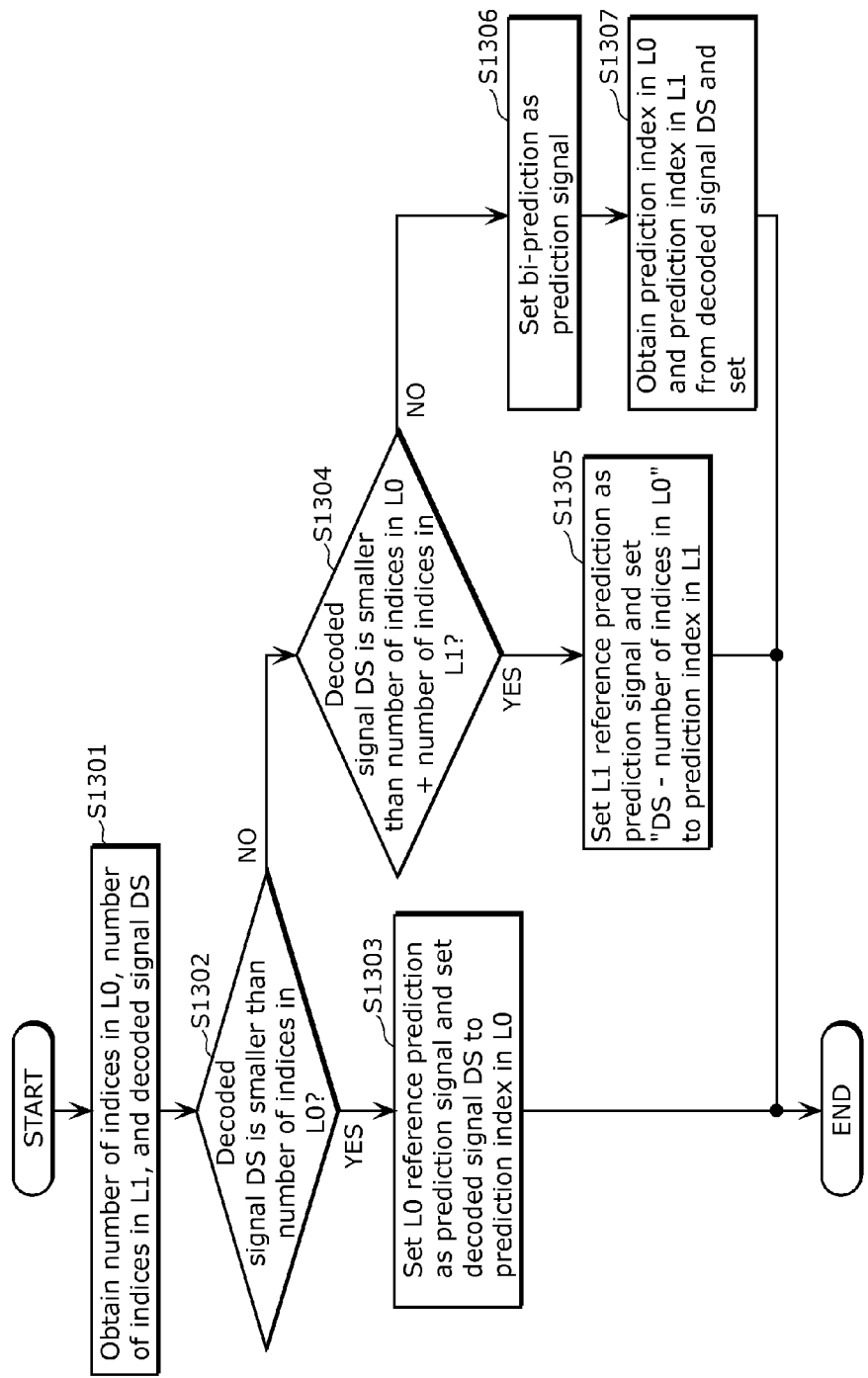
FIG. 13 is a flowchart showing a flow of division of a coded signal.

Next, with reference to FIG. 13, description is given on how to divide the bitstream BS into inter prediction mode information and reference index information, when the bitstream BS is index information obtained as information related to inter prediction coding. It is to be noted that, in the same manner as described in Embodiment 1, the inter prediction mode information indicates whether only one of reference picture lists is used or both of the reference picture lists are used. Furthermore, the reference index information is index information indicating a reference picture to be actually referred to in the reference picture list identified by the reference picture information. The example here shows a case in which there are only two types of reference picture list (reference picture list L0 and reference picture list L1).

First, a bitstream BS decoded by referring to the VLD table is obtained from the table reference unit 915, and the number of indices included in the reference picture list L0 and the number of indices included in the reference picture list L1 are obtained from the control unit 911 (S1301). When the obtained decoded signal DS is smaller than the number of indices in the reference picture list L0 (YES in S1302), as the prediction signal of the intra prediction mode information, it is set that the prediction is performed using one of the reference pictures registered in the reference picture list L0, and, as the reference index information, the value of the decoded signal DS is set to the prediction index of the reference picture list L0 (S1303).

On the other hand, when the decoded signal DS is greater than the number of indices in the reference picture list L0 (NO in S1302), a determination is made on whether or not the decoded signal DS is smaller than the sum of the number of indices in the reference picture list L0 and the number of indices in the reference picture list L1. When the determination result shows that the decoded signal DS is smaller (YES in S1304), as the prediction signal of the intra prediction mode information, it is set that the prediction is performed using one of the reference picture registered in the reference picture list L1, and, as the reference index information, a value obtained by subtracting the number of indices in the reference picture list L0 from the value of the decoded signal DS is set to the prediction index number in the reference picture list L1 (S1305). On the other hand, when the result in S1304 is NO, as the prediction signal of the intra prediction mode information, it is set that the prediction is bidirectional (bi) prediction (S1306). Next, the prediction index number in the reference picture list L0 and the prediction index number in the reference picture list-L1 are obtained from the decoded signal DS in a manner described later, and set (S1307).

The prediction index number in the reference picture list L0 in the case of the bi-prediction is a value represented by a quotient obtained by dividing the value, which is obtained by subtracting the number of predicted indices in the reference picture list L0 and the number of predicted indices in the reference picture list L1 from the decoded signal DS, by the number of predicted indices in the reference picture list L1. Furthermore, the prediction index number in the reference picture list L1 is the value represented by the remainder obtained by dividing the value, which is obtained by subtracting the number of prediction indices in the reference picture list L0 and the number of prediction indices in the reference picture list L1 from the decoded signal DS, by the number of predicted indices in the reference picture list L1.

The above division can be represented by Expression 4, for example.

```
if ( DecodedIdx < Number(L0) )
{
PredDir = L0-Pred;
L0Idx = DecodedIdx;
}
else if( DecodedIdx < Number(L0)+Number(L1) )
{
PredDir = L1-Pred;
L1Idx = DecodedIdx-Number(L0);
}
else
{
PredDir  = Bi-Pred;
L0Idx    = Quotient{{DecodedIdx-{Number(L0)+Number(L1)}, Numer(L1)}
L1Idx    = Mod( DecodedIdx-{Number(L0)+Number(L1)}, Number(L1) )
}
```
Expression 4

It is to be noted that PredDir is inter prediction mode information, that is information indicating whether: one of the reference pictures registered in only the reference picture list L0 is used (L0-Pred); one of the reference pictures registered in only the reference picture list L1 is used (L1-Pred); or both of the reference picture lists L0 and L1 are used (Bi-Pred). Furthermore, DecodedIdx indicates the decoded signal DS, Number(L0) indicates the number of indices in the reference picture list L0, Number(L1) indicates the number of indices in the reference picture list L1, L0Idx indicates the reference index number in the reference picture list L0, and L1Idx indicates the reference index number in the reference picture list L1.

It is to be noted that Quotient(A, B) indicates a quotient obtained by dividing A by B, and Mod(A, B) represents the remainder obtained by dividing A by B.

It is to be noted that as described in Embodiment 1, when Number(L1) is not expressed as a power of 2 and an offset value is preliminarily added to Number(L1) to make the obtained number the smallest value expressed as a power of 2 that exceeds Number(L1) in coding, L0Idx is a value obtained by shifting to the right, from a value of DecodedIdx−{Number(L0)+Number(L1)}, by the multiplier value of 2 obtained by adding the above offset, while L1Idx is a value obtained by subtracting, from the value of DecodedIdx−{Number(L0)+Number(L1)}, the multiplier value of L0Idx of 2 (value obtained by shifting 1 to the left by the value of L0Idx). Furthermore, in the same manner as in coding, it is necessary to skip indices which are not used. With the above processing, division can be omitted which makes the arithmetic circuit smaller.

Next, description is given on a flow of processing performed by the VLD table selection unit 914, with reference to FIG. 14 and FIGS. 15A to 15C.

The VLD table selection unit 914 obtains the number of indices in the reference picture list L0 and the number of indices in the reference picture list L1 from the control unit 911 (S1401). It is to be noted that, the number of indices in the reference picture list L0 and the number of indices in the reference picture list L1 are information that has already been decoded as the header information of the stream, prior to decoding of the current signal to be decoded. Next, the maximum variation range is calculated from the obtained number of indices in the reference picture list L0 and the number of indices in the reference picture list L1 (S1402). Here, the maximum variation range (MaxRange) can be calculated using Expression 2, in the same manner as in coding. Next, the VLD table selection unit 914 selects a VLD table according to the maximum variation range (S1403).

Figures 14, 15A:
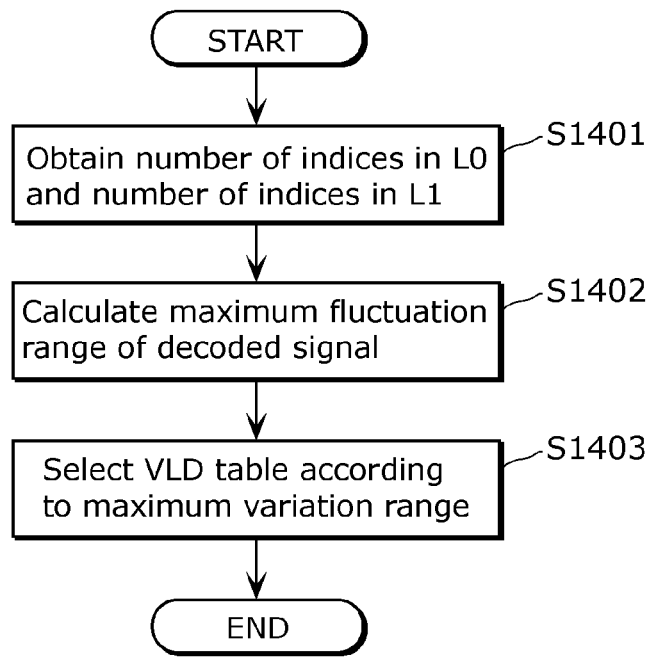
FIG. 14 is a flowchart showing a flow of steps for selecting a VLD table.
FIG. 15A is a schematic diagram showing an example of combinations in VLD table selection.
Figure 15C:
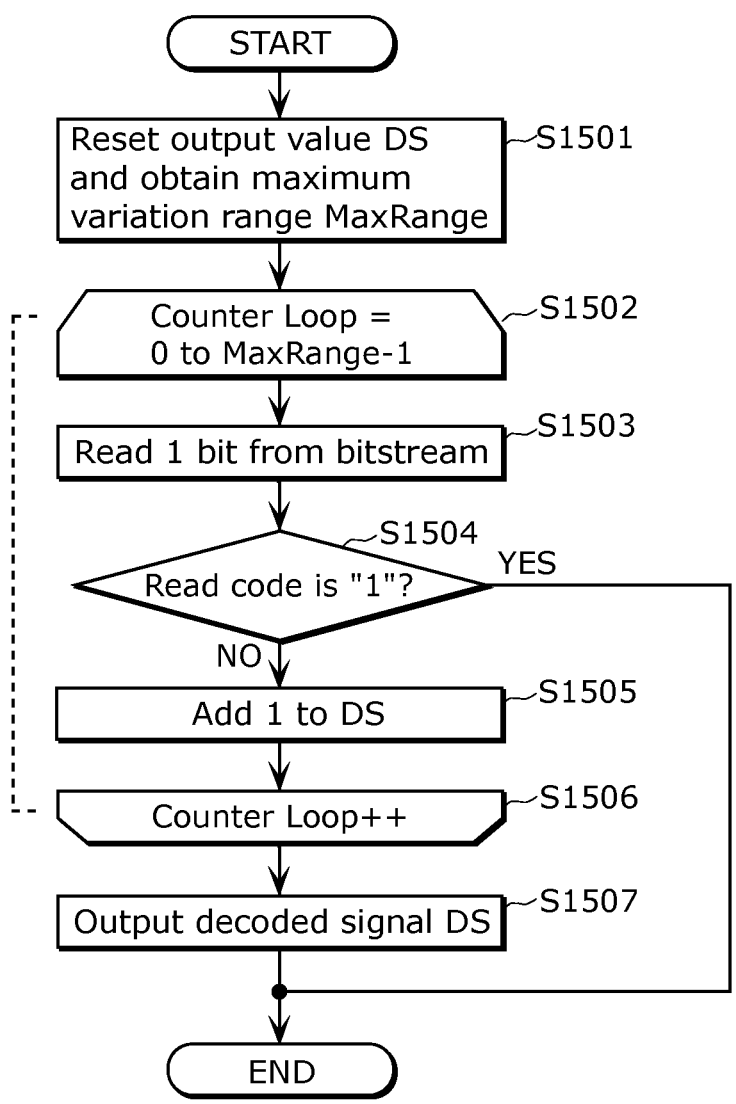
FIG. 15C is a flowchart showing a flow of processing of VLD decoding method.

FIGS. 15A to 15C each shows an example of the case where a VLD table is selected according to the maximum variation range. For example, FIG. 15A is an example showing an association between the maximum variation ranges (MaxRanges) and the VLD table group shown in FIG. 12A. It is to be noted that in the case where the maximum variation range is "2", the VLD table does not have to be used since the current signal can be coded/decoded as a simple flag showing 0 or 1.

In 15A, in the case where the maximum variation range is "3", a VLD table with short codes is selected. On the other hand, in the case where the maximum variation range is long, it is sometimes more efficient to select a different VLD table according to the occurrence probability. Therefore, an example is shown in which a different VLD table is used in the case where the maximum variation range is great (FIG. 15A shows an example in which a different VLC table is used in the case where the maximum variation range is greater than or equal to "11"), while a common VLD table is used except for the above cases.

Using such an association reduces switching of the VLD table, which reduces the processing amount. In other words, there is an advantage that the amount of memory used to hold the VLD table can be saved. It is required to use the same selecting scheme as in coding, for selecting of a VLD table. The example shown in FIG. 15A shows a case where the scheme for selecting VLC table shown in FIG. 8A is used in coding.

On the other hand, FIG. 15B shows an example of a scheme in which, since the maximum variation range is already known, the code in the VLD table is increased on a bit basis and the least significant bit of the longest code is deleted (corresponding to the case where the scheme for selecting the VLC table in FIG. 8B is used in coding). For example, when the maximum variation range is "5", codes having the same length (0001, 0000) can be used for the symbol 3 and symbol 4, respectively. The advantage here is that the coding amount can be saved in a portion having the maximum variation range. Furthermore, the scheme shown in FIG. 15B can also be decoded by a scheme of Expression 5, instead of table reference.

```
DS = 0;
for( counter=0; counter<MaxRange; counter++ )
{
code = read_code( );
if ( code == "1" )
{
break;
}
else
{
DS += 1;
}
}                                                          Expression 5
```

FIG. 15C is a flowchart showing a flow of processing of Expression 5. First, the decoded signal DS is reset (set to 0), and the above-obtained maximum variation range MaxRange is obtained (S1501). Next, repetition processing is performed in a time period during which the counter has a value from 0 to MaxRange −1 (processing between S1502 and S1506).

As the repetition processing, 1 bit is read from the bitstream (S1504), a determination is made on whether or not the read code is 1 (S1504), and 1 is added to the decoded signal DS (S1505). On the other hand, when the read code is not 1 (NO in S1504), processing to add 1 to the decoded signal DS is performed (S1505), the counter is incremented by one (S1506), and the processing goes back to repetition processing in S1502. On the other hand, when the read code is 1 (YES in S1504), the repetition processing is skipped and the processing proceeds to the next step. When the repetition processing is ended or the result shows YES in S1504, decoding is performed by outputting the decoded signal DS at the time point (S1507).

The above processing allows correctly decoding the bitstream coded by the coding method of the present invention, and therefore a coding method and a decoding method with high coding efficiency can be provided.

[Embodiment 3]

Figure 16:
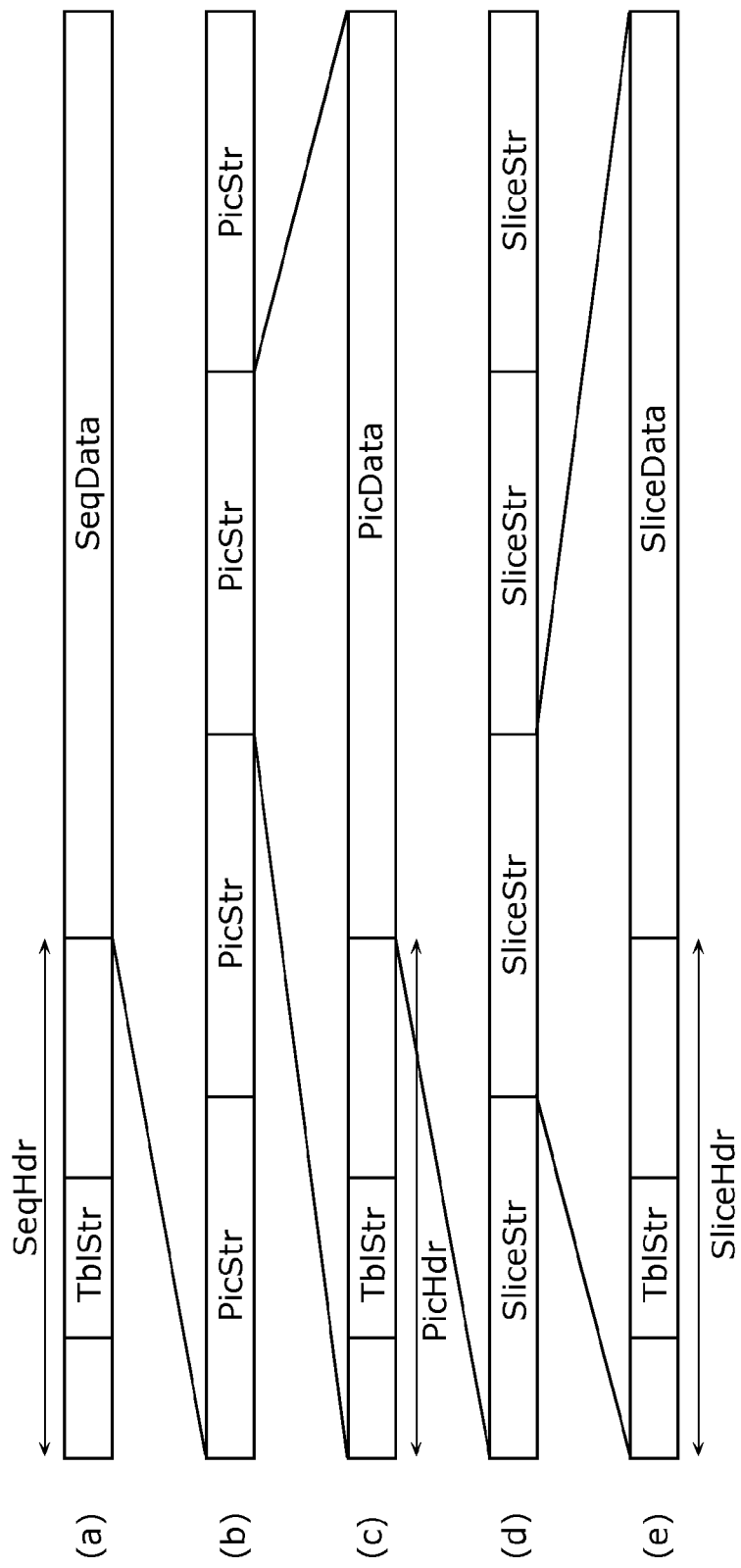
FIG. 16 shows (a) a configuration example of a bitstream BS of a coded image corresponding to a video sequence in Embodiment 3, (b) a structure example of sequence data, (c) a structure example of a picture signal, (d) a structure example of picture data, and (e) a structure example of a slice signal.

In the present embodiment, a coding method and a decoding method are described in which table-related information TblStr is described as header information of a stream. TblStr indicates an association between a signal and a table referred to. FIG. 16 is a diagram showing a configuration of the bitstream BS in the image coding method according to the present invention. (a) in FIG. 16 indicates a coded signal corresponding to a video sequence formed of at least one screen. The coded signal includes sequence data SeqData which is data for the entire screen, and a sequence header SeqHdr which is data common to all the data for the entire screen.

Figure 17:
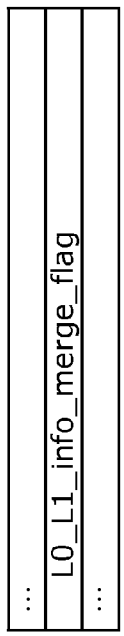
FIG. 17 shows an example of syntax of table-related information.
Figure 18:
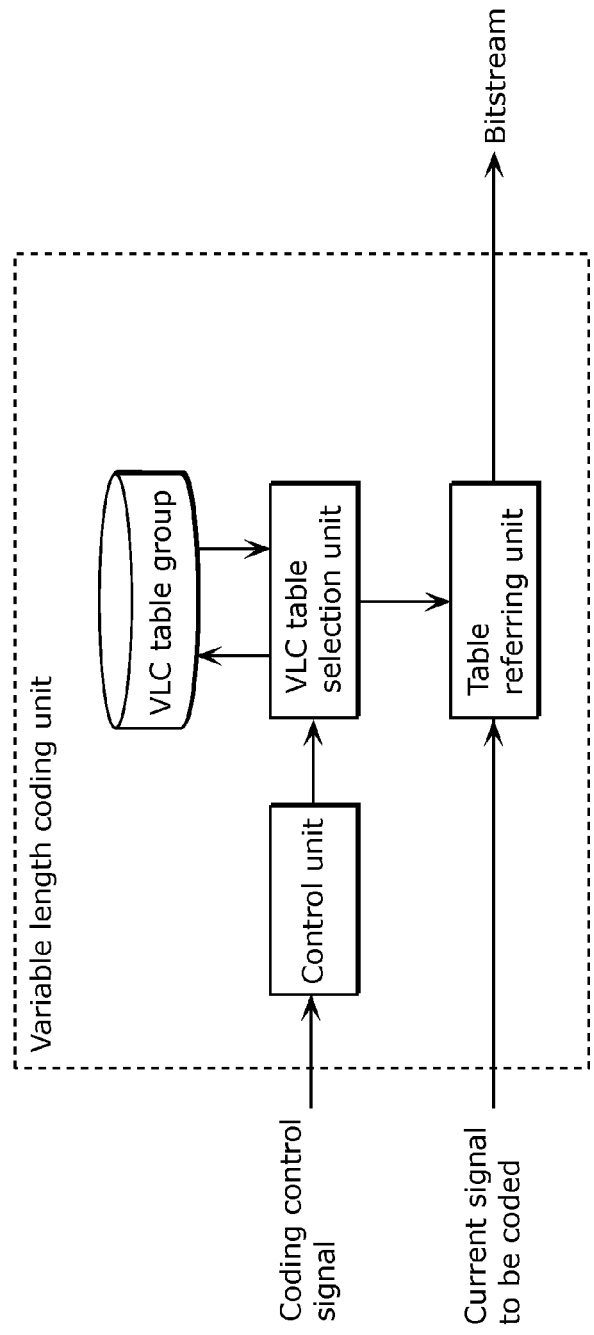
FIG. 18 is a block diagram of a conventional variable-length coding unit.
Figure 19:
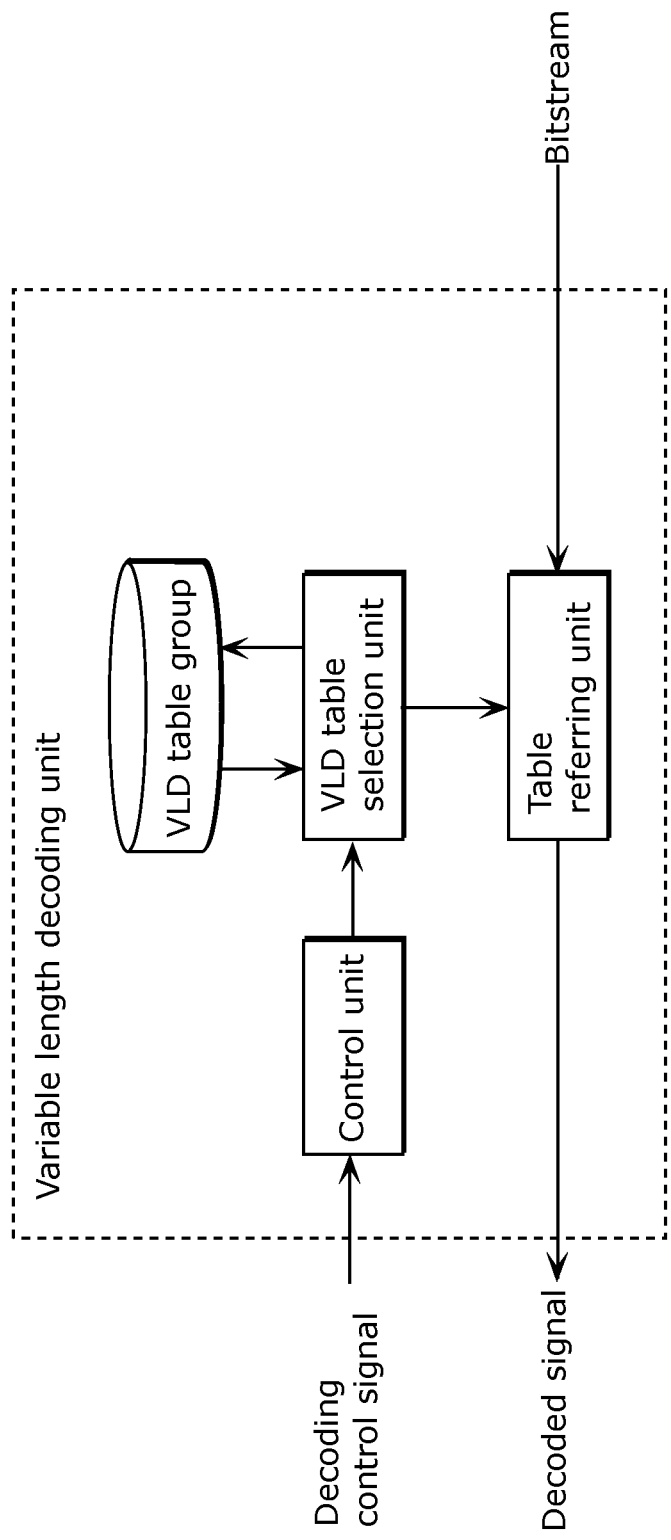
FIG. 19 is a block diagram of a conventional variable-length decoding unit.

The table-related information TblStr indicates, for example, the case where the number of indices in the reference picture list L0 and the number of indices in the reference picture list L1 are the same, and the reference picture indicated by the reference index number in the reference picture list L0 and the reference picture indicated by the reference index number in the reference picture list L1 are the same. FIG. 17 is an example of syntax including a flag indicating the above information, which is "L0_L1_info_merge_flg".

When this flag indicates 1, the reference picture registered in the reference picture list L0 and the reference picture registered in the reference picture list L1 are the same, and therefore it can be regarded that an L1 reference mode is not present as the prediction mode. In this case, for example, the index can be determined using the scheme shown by Expression 6.

```
if ( PredDir == L0-Pred )
{
TargetIdx = L0Idx;
}
else // ( PredDir == Bi-Pred )
{
TargetIdx = Number(L0)+L0Idx*Number(L0)+L1Idx;
}                                               Expression 6
```

It is to be noted that PredDir is inter prediction mode information, that is information indicating whether: one of the reference pictures registered in only the reference picture list L0 is used (L0-Pred); one of the reference pictures registered in only the reference picture list L1 is used (L1-Pred); or both of the reference picture lists L0 and L1 are used. Furthermore, TargetIdx indicates the output index, Number(L0) indicates the number of indices in the reference picture list L0, L0Idx indicates the reference index number in the reference picture list L0, and L1Idx indicates the reference index number in the reference picture list L1.

It can be understood that the maximum variation range in this case can be calculated by Expression 7 for example, and can be represented by a short code length.

$$\text{MaxRange} = \text{Number}(L0) + \{\text{Number}(L1) \ast \text{Number}(L0)\} \quad \text{Expression 7}$$

It is to be noted that in the same manner as in Expression 1, Number(L0) indicates the number of indices in the reference picture list L0, and Number(L1) indicates the number of indices in the reference picture list L1. It is to be noted that the bitstream coded using the above scheme can be decoded by a scheme shown by Expression 8 in decoding.

```
if ( DecodedIdx < Number(L0) )
{
PredDir = L0-Pred;
L0Idx = DecodedIdx;
}
else
{
PredDir = Bi-Pred;
L0Idx = Quotient( DecodedIdx−Number(L0),Number(L0) )
L1Idx = Mod( DecodedIdx−Number(L0), Number(L0) )
}                                               Expression 8
```

It is to be noted that Quotient(A, B) indicates a quotient obtained by dividing A by B, and Mod(A, B) represents the remainder obtained by dividing A by B. It is to be noted that in the same manner as in Embodiment 1 and Embodiment 2, the division may be omitted and shift operation may be performed.

The sequence header includes the table-related information TblStr.

(b) in FIG. 16 shows a structure of the sequence data SeqData. The sequence data SeqData includes a plurality of picture signals PicStr. Each picture signal PicStr is a coded signal corresponding to one screen and is a coded signal of a picture.

(c) in FIG. 16 shows a structure of the picture signal PicStr. The picture signal PicStr includes picture data PicData which is data for one screen, and a picture header PicHdr which is data common to the entirety of one screen. The picture header PicHdr includes the table-related information TblStr.

(d) in FIG. 16 shows a structure of the picture data PicData. The picture data PicData includes a plurality of slice signals SliceStr. Each slice signal SliceStr is a coded signal, which is a set of a plurality of block units, of a slice.

(e) in FIG. 16 shows a structure of the slice signal SliceStr. The slice signal SliceStr includes slice data SliceData which is data of one slice, and a slice header SliceHdr which is data common to all the data of one slice. The slice header SliceHdr may include the table-related information TblStr. This allows correctly decoding the coded signal received per slice data SliceData.

It should be noted that when the sequence data SeqData includes a plurality of the picture signals PicStr, only some of the PicHdr may include the table-related information TblStr, rather than all the PicHdr includes the table-related information TblStr. Likewise, when the picture data PicData includes a plurality of slice signals SliceStr, only some of the slice headers SliceHdr may include the table-related information TblStr rather than all the slice headers SliceHdr includes the table-related information TblStr. If the content of the table-related information TblStr is common to the slices and if the table-related information TblStr is not in the slice header SliceHdr as shown in (e) in FIG. 16, it is possible to substitute the table-related information TblStr included in the slice header SliceHdr of other slice for the table-related information TblStr of a current slice. This can suppress an increase of the number of bits due to the table-related information TblStr being repeated.

Alternatively, when the bitstream BS is transmitted in packets which are nonconsecutive data units rather than a consecutive bitstream, the header portion and the data portion other than the header may separately be transmitted. In this case, the header portion and data portion are not included in a single bitstream as shown in FIG. 16. When packets are employed, however, the header portion and the data portion are not transmitted in consecutive order, and a corresponding data portion and a corresponding header portion are merely transmitted in different packets. In other words, although the bitstream BS is not a single bitstream, the concept is the same as the case of bitstream described with reference to FIG. 16.

Furthermore, in the decoding method according to the present invention, the bitstream BS coded by the above method is decoded by the following procedure. First, the table-related information TblStr included in the sequence header SeqHdr is obtained, and the obtained table-related information TblStr is held. Next, the table-related information TblStr included in the picture header PicHdr is obtained, and the obtained table-related information TblStr is updated. Here, if the table-related information TblStr or a portion thereof is not present, the information included in the sequence header SeqHdr is held as it is. Likewise, the table-related information TblStr included in the slice header SliceHdr is obtained, and the obtained table-related information TblStr is updated.

With this, the above bitstream can be correctly decoded.

[Embodiment 4]

The processing described in each of the above embodiments can be simply implemented in an independent computer system, by recording, in a recording medium, a program for implementing the configurations of the moving picture coding method (image coding method) and the moving picture decoding method (image decoding method) described in each of the embodiments. The recording media may be any recording media as long as the program can be recorded, such as a magnetic disk, an optical disk, a magnetic optical disk, an IC card, and a semiconductor memory.

Hereinafter, the applications to the moving picture coding method and the moving picture decoding method described in each of the embodiments and systems using thereof will be described.

Figure 20:
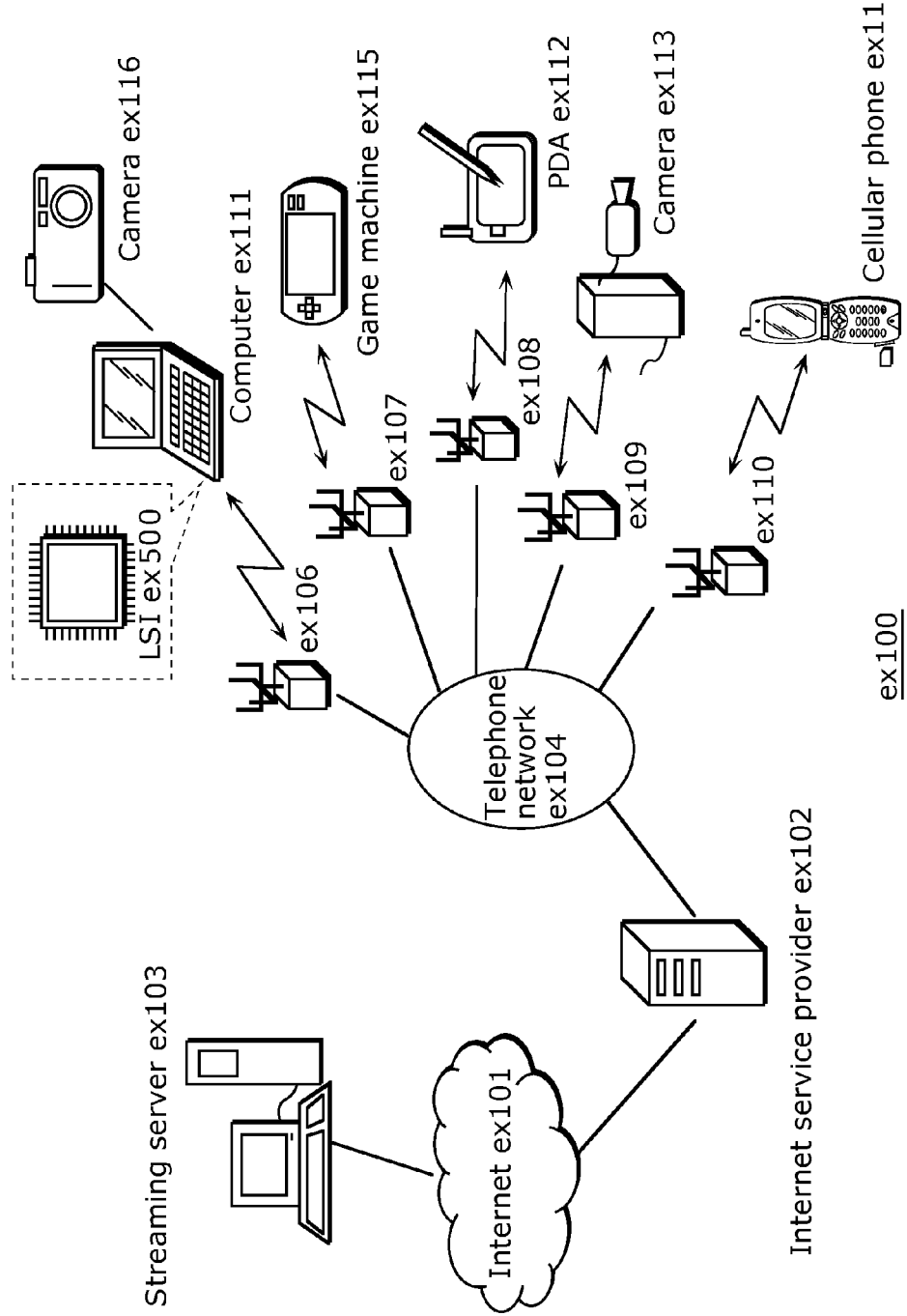
FIG. 20 shows an overall configuration of a content providing system for implementing content distribution services.

FIG. 20 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 20, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables real-time distribution and others. In real-time distribution, a content (for example, video of a music live show) captured by the user using the camera ex113 is coded as described above in each of the embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, without limiting to the camera ex113, the data of the still images and video captured by the camera ex116 may also be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for encoding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 21:
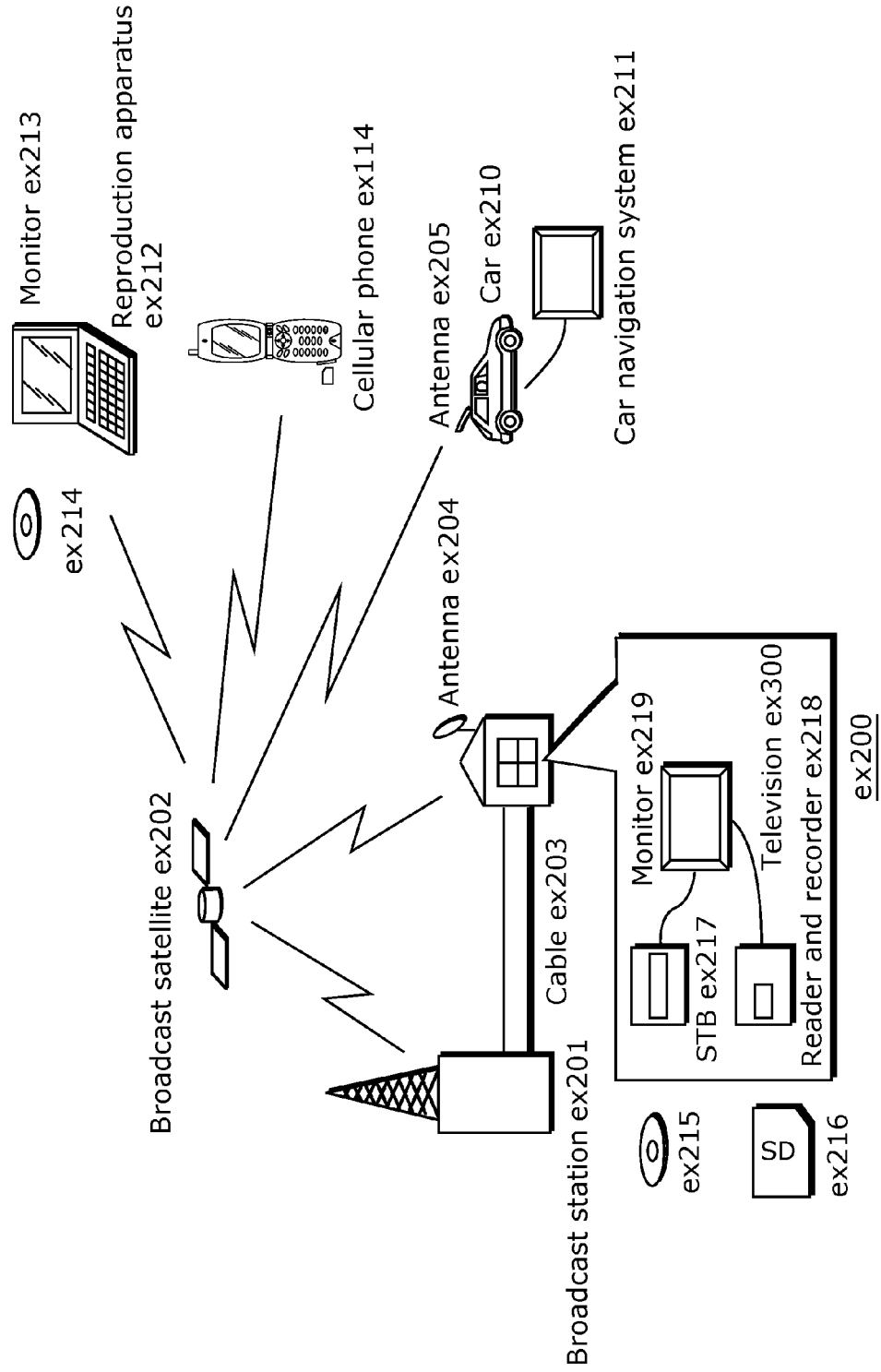
FIG. 21 shows an overall configuration of a digital broadcasting system.

Aside from the example of the content providing system ex100, at least one of the moving picture coding apparatus and the moving picture decoding apparatus described in each of the embodiments may be implemented in a digital broadcasting system ex200 illustrated in FIG. 21. More specifically, a broadcast station ex201 communicates, or transmits to a broadcast satellite ex202, via radio waves, multiplexed data obtained by multiplexing audio data and others onto video data. The video data is data coded by the moving picture coding method described in each of the embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300, a set-top box (STB) ex217, and others decodes the received multiplexed data, and reproduces the decoded data.

Furthermore, a reader/recorder ex218 (i) reads and decodes the multiplexed data recorded on a recording medium ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as described in each of the embodiments. In this case, the reproduced video signals are displayed on the monitor ex219, and can be reproduced by another device or system using the recording medium ex215 on which the multiplexed data is recorded. It is also possible to implement the moving picture decoding apparatus in the set-top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set-top box but in the television ex300.

Figure 22:
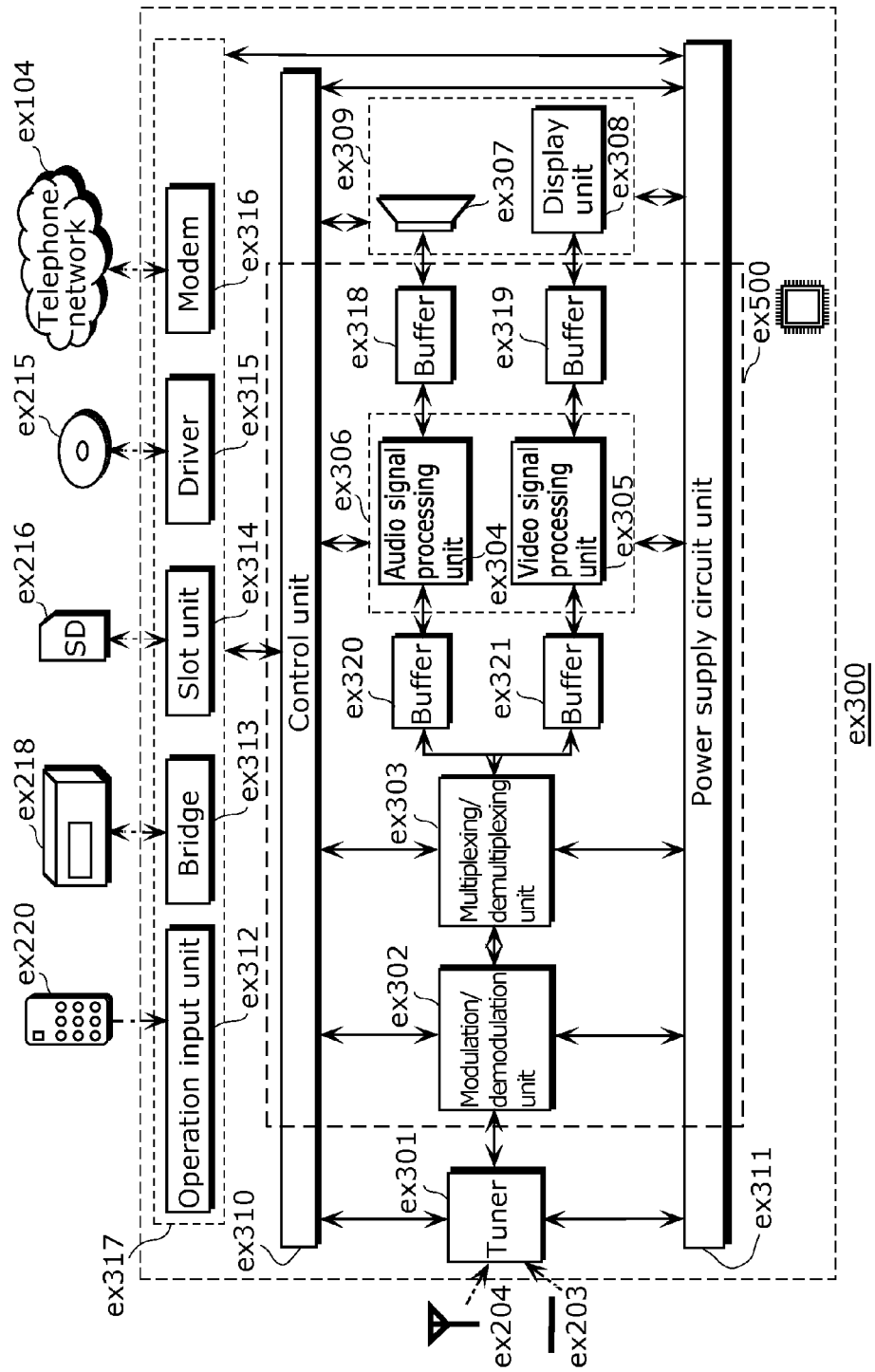
FIG. 22 shows a block diagram illustrating an example of a configuration of a television.

FIG. 22 illustrates the television (receiver) ex300 that uses the moving picture coding method and the moving picture decoding method described in each of the embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306.

The television ex300 further includes: a signal processing unit ex306 including an audio signal processing unit ex304 that code and decode an audio signal and a video signal processing unit ex305 that code and decode video data; and an output unit ex309 including a speaker ex307 that provides the decoded audio signal, and a display unit ex308, such as a display, that displays the decoded video signal. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration will be described in which the television ex300 decodes multiplexed data obtained from outside through the antenna ex204 and others and reproduces the decoded data. In the television ex300, upon reception of a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of the embodiments, in the television ex300. The output unit ex309 provides the decoded video signal and audio signal outside, respectively. When the output unit ex309 provides the video signal and the audio signal, the signals may be temporarily stored in buffers ex318, ex319, and others, so that the signals are reproduced in synchronization with each other. Furthermore, the television ex300 may read multiplexed data not from a broadcast and others but from the recording media ex215 and ex216, such as a magnetic disk, an optical disk, and a SD card. Next, a configuration will be described in which the television ex300 codes an audio signal and a video signal, and transmits the data outside or writes the data on a recording medium and others. In the television ex300, upon reception of a user operation through the remote controller ex220 and others, the audio signal processing unit ex304 codes an audio signal, and the video signal processing unit ex305 codes a video signal, under control of the control unit ex310 using the coding method described in each of the embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320, ex321, and others, so that the signals are reproduced in synchronization with each other. Here, the buffers ex318, ex319, ex320, and ex321 may be plural as illustrated, or at least one buffer may be shared in the television ex300. Furthermore, in addition to the shown structure, data may be stored in a buffer so that the system overflow and underflow may be avoided between the modulation/demodulation unit ex302 and the multiplexing/demultiplexing unit ex303, for example.

In addition to the configuration for obtaining audio and video data from a broadcast, a recording medium, and the like, the television ex300 may include a configuration for receiving an AV input from a microphone or a camera, and may code the received data. Although it has been described that the television ex300 can code, multiplex, and provide outside data, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may perform the above decoding or encoding, and the television ex300 and the reader/recorder ex218 may share the above decoding or encoding.

Figure 23:
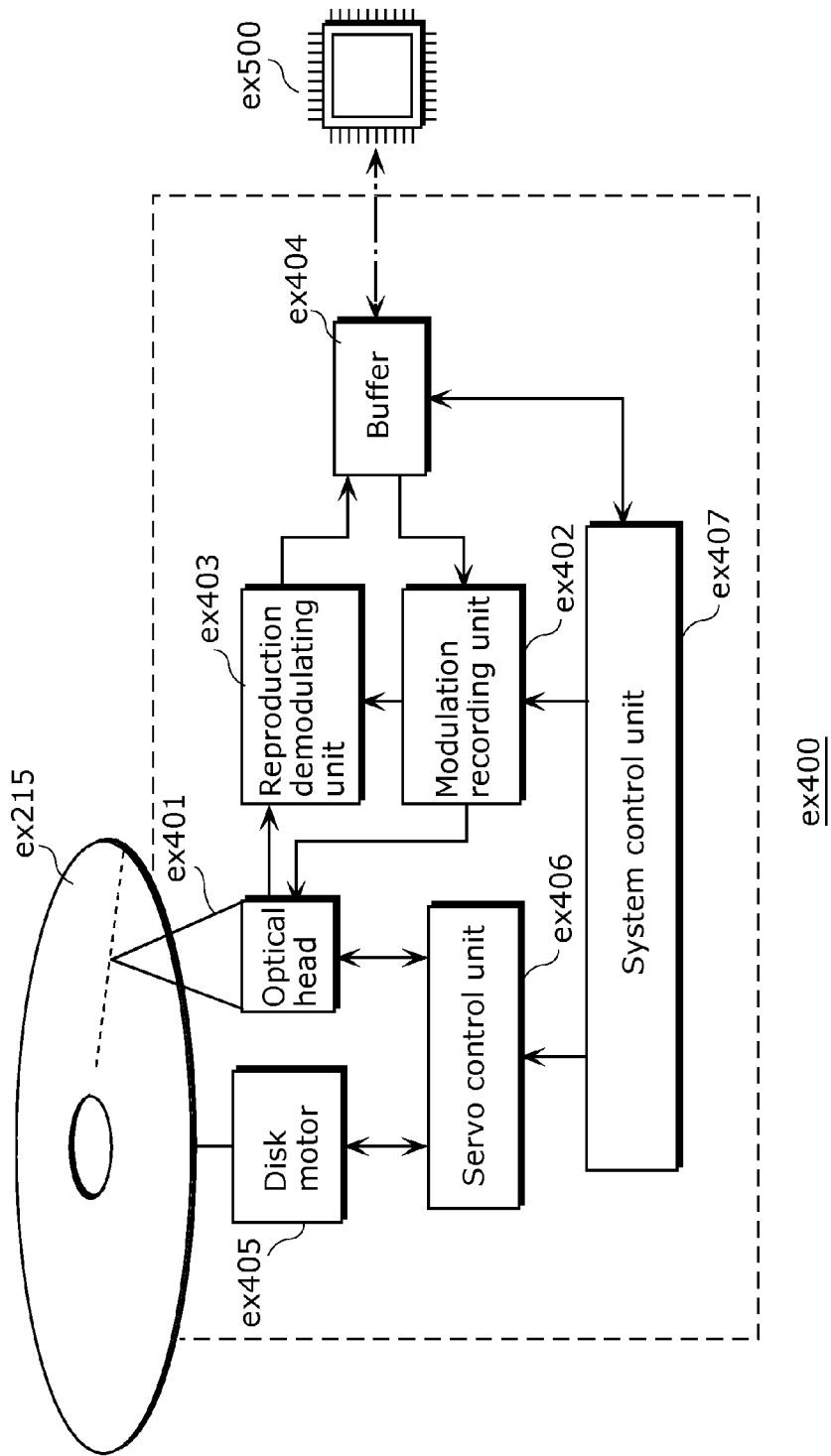
FIG. 23 shows a block diagram illustrating an example of a configuration of an information reproducing/recording unit that reads and writes information from and on a recording medium that is an optical disk.

As an example, FIG. 23 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215, that is an optical disk, to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215, to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls the overall information reproducing/recording unit ex400. The above reading and writing processes can be implemented by the system control unit ex407, by using various information stored in the buffer ex404 and generating and adding new information as necessary, and by causing the modulation recording unit ex402, the reproduction demodulating unit ex403, and the servo control unit ex406 to operate in a coordinated manner so that the information is recorded and reproduced through the optical head ex401. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
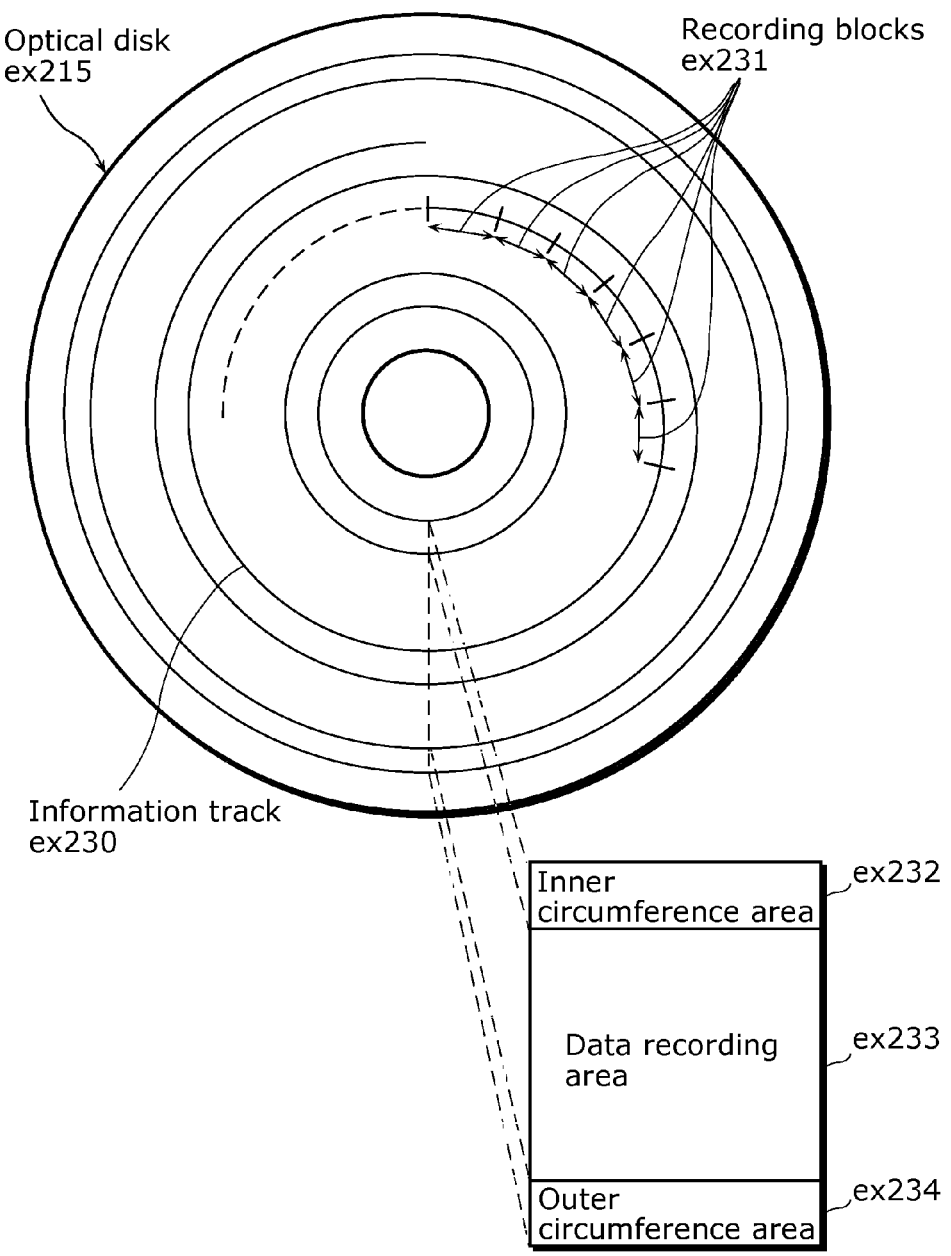
FIG. 24 shows an example of a configuration of a recording medium that is an optical disk.

FIG. 24 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 22. The same will be true for the configuration of the computer ex111, the cellular phone ex114, and others.

(a) in FIG. 25 illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to (b) in FIG. 25. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of the embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of the embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of the embodiments can be used in any of the devices and systems described. Thus, the advantages described in each of the embodiments can be obtained.

Furthermore, the present invention is not limited to embodiments, and various modifications and revisions are possible without departing from the scope of the present invention.

[Embodiment 5]

Video data can be generated by switching, as necessary, between (i) the moving picture coding method or the moving picture coding apparatus shown in each of the embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of the embodiments will be hereinafter described. The multiplexed data is a digital stream in the MPEG-2 Transport Stream format.

FIG. 26 illustrates a structure of the multiplexed data. As illustrated in FIG. 26, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of the embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

FIG. 27 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

FIG. 28 illustrates how a video stream is stored in a stream of PES packets in more detail. The first bar in FIG. 28 shows a video frame stream in a video stream. The second bar shows the stream of PES packets. As indicated by arrows denoted as yy1, yy2, yy3, and yy4 in FIG. 28, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 29 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively.

When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 29. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 30 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Each of the multiplexed data information files is management information of the multiplexed data as shown in FIG. 31. The multiplexed data information files are in one to one correspondence with the multiplexed data, and each of the files includes multiplexed data information, stream attribute information, and an entry map.

As illustrated in FIG. 31, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

As shown in FIG. 32, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of the embodiments includes a step or a unit for allocating unique information indicating video data generated by the moving picture coding method or the moving picture coding apparatus in each of the embodiments, to the stream type included in the PMT or the video stream attribute information. With the configuration, the video data generated by the moving picture coding method or the moving picture coding apparatus described in each of the embodiments can be distinguished from video data that conforms to another standard.

Furthermore, FIG. 33 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of the embodiments. When it is determined that the stream type or the video stream attribute information indicates that the multiplexed data is generated by the moving picture coding method or the moving picture coding apparatus in each of the embodiments, in Step exS102, decoding is performed by the moving picture decoding method in each of the embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of the embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

[Embodiment 6]

Each of the moving picture coding method, the moving picture coding apparatus, the moving picture decoding method, and the moving picture decoding apparatus in each of the embodiments is typically achieved in the form of an integrated circuit or a Large Scale Integrated (LSI) circuit. As an example of the LSI, FIG. 34 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of the embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

[Embodiment 7]

When video data generated in the moving picture coding method or by the moving picture coding apparatus described in each of the embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

In order to solve the problem, the moving picture decoding apparatus, such as the television ex300 and the LSI ex500 is configured to determine to which standard the video data conforms, and switch between the driving frequencies according to the determined standard. FIG. 35 illustrates a configuration ex800 in the present embodiment. A driving frequency switching unit ex803 sets a driving frequency to a higher driving frequency when video data is generated by the moving picture coding method or the moving picture coding apparatus described in each of the embodiments. Then, the driving frequency switching unit ex803 instructs a decoding processing unit ex801 that executes the moving picture decoding method described in each of the embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of the embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 34. Here, each of the decoding processing unit ex801 that executes the moving picture decoding method described in each of the embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 37. The driving frequency can be selected by storing the look-up table in the buffer ex508 and in an internal memory of an LSI, and with reference to the look-up table by the CPU ex502.

FIG. 36 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of the embodiments, based on the identification information. When the video data is generated by the moving picture coding method and the moving picture coding apparatus described in each of the embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of the embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of the embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of the embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of the embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

[Embodiment 8]

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of the embodiments and the decoding processing unit that conforms to the conventional standard, such as MPEG-2, MPEG-4 AVC, and VC-1 are partly shared. Ex900 in (a) in FIG. 38 shows an example of the configuration. For example, the moving picture decoding method described in each of the embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to the present invention. Since the present invention is characterized by inverse quantization in particular, for example, the dedicated decoding processing unit ex901 is used for inverse quantization. Otherwise, the decoding processing unit is probably shared for one of the entropy coding, deblocking filtering, and motion compensation, or all of the processing. The decoding processing unit for implementing the moving picture decoding method described in each of the embodiments may be shared for the processing to be shared, and a dedicated decoding processing unit may be used for processing unique to that of MPEG-4 AVC.

Furthermore, ex1000 in (b) in FIG. 38 shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method according to the present invention and the conventional moving picture decoding method. Here, the dedicated decoding processing units ex1001 and ex1002 are not necessarily specialized for the processing according to the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the present invention and the moving picture decoding method in conformity with the conventional standard.

With the image coding method and the image decoding method according to the present invention, integration of coding information, table update according to image characteristics, and table selection can be performed with less processing amount and coding amount, which produces advantageous effects of reducing the coding amount significantly, which cannot be achieved by the conventional variable-length coding and decoding methods. The present invention is available for various purposes such as accumulation, transmission, and communication. For example, the present invention is specifically available for high-definition information display devices and imaging devices, such as TVs, digital video recorders, car navigation systems, mobile phones, digital cameras, and digital video cameras for example, and has great utility value.

REFERENCE SIGNS LIST 10, 100 Image coding apparatus
90, 900 Image decoding apparatus
11, 91 Obtaining unit
12 Mixed signal generating unit
13, 92 Table selection unit
14, 220 Variable-length coding unit
93, 910 Variable length decoding unit
94 Dividing unit
110 Subtraction unit
120 Transform unit
130 Quantization unit
140, 930 Inverse quantization unit
150 940 Inverse transform unit
160, 970 Adder unit
170, 950 Intra prediction unit
180, 960 Inter prediction unit
190 Coding control unit
200, 210, 980 Switch
221, 911 Control unit
222 Signal mixing unit
223 VLC table group
224 VLC table selection unit
225, 915 Table reference unit
226, 916 Table update unit
912 Signal dividing unit
913 VLD table group
914 VLD table selection unit
920 Decoding control unit

The invention claimed is:

1. An image coding method for coding an image, the method comprising:
obtaining first information and second information from a current signal to be coded, the first information identifying at least one reference picture list used in inter prediction of the image out of a plurality of reference picture lists, the second information identifying at least one reference picture used in the inter prediction of the image out of reference pictures included in the at least one reference picture list identified by the first information;
mixing the first information and the second information to generate a mixed signal;
calculating a maximum variation range of the mixed signal based on a total number of the reference pictures included in the at least one reference picture list, the maximum variation range indicating a total number of possible values of the mixed signal;
selecting a variable-length coding table according to the maximum variation range of the mixed signal; and
variable-length coding the mixed signal using the selected variable-length coding table.

2. The image coding method according to claim 1, wherein the variable-length coding table holds a plurality of possible values of the mixed signal in association with a plurality of codes, and
the plurality of codes includes two longest codes each having a different value in a least significant digit.

3. The image coding method according to claim 1, wherein in the selecting, the variable-length coding table is selected according to the maximum variation range which is a total number of combinations of reference pictures (i) in a case where one of the reference pictures registered in one of a first picture list and a second picture list is used and (ii) in a case where one of the reference pictures registered in each of the first picture list and the second picture list is used.

4. The image coding method according to claim 3, wherein, in the selecting,
a number $n_1$ of registration indices in the first picture list and a number $n_2$ of registration indices in the second picture list are obtained from the current signal, and
the variable-length coding table is selected according to the maximum variation range calculated by $n_1+n_2+(n_1 \times n_2)$.

5. The image coding method according to claim 3, wherein, in the selecting,
when the reference pictures registered in the first picture list and the reference pictures registered in the second picture list are the same, a number $n_1$ of registration indices in the first picture list is obtained from the current signal, and
the variable-length coding table is selected according to the maximum variation range calculated by $n_1+(n_1 \times n_1)$.

6. The image coding method according to claim 1, further comprising
updating the variable-length coding table used in the variable-length coding,
wherein, in the updating, the association between the codes and the possible values of the mixed signal is changed to shorten the code length of a code associated with the value of the mixed signal.

7. An image decoding method for decoding a coded image, the method comprising:
obtaining a coded mixed signal which is a mixed signal that has been coded;
calculating a maximum variation range of the mixed signal based on a total number of reference pictures included in at least one reference picture list, the maximum variation range indicating a total number of possible values of the mixed signal;
selecting a variable-length decoding table according to the maximum variation range of the mixed signal;
variable-length decoding the coded mixed signal using the selected variable-length decoding table; and
dividing the decoded mixed signal into first information and second information, the first information identifying the at least one reference picture list used in inter prediction of the image out of a plurality of reference picture lists, and the second information identifying at least one reference picture used in the inter prediction of the image out of the reference pictures included in the at least one reference picture list identified by the first information.

8. An image coding apparatus which codes an image, the apparatus comprising:
an obtaining unit configured to obtain first information and second information from a current signal to be coded, the first information identifying at least one reference picture list used in inter prediction of the image out of a plurality of reference picture lists, and the second information identifying at least one reference picture used in the inter prediction of the image out of reference pictures included in the at least one reference picture list identified by the first information;
a mixed signal generating unit configured to mix the first information and the second information obtained by the obtaining unit to generate a mixed signal;
a maximum variation range calculating unit configured to calculate a maximum variation range of the mixed signal based on a total number of the reference pictures included in the at least one reference picture list, the maximum variation range indicating a total number of possible values of the mixed signal;
a table selection unit configured to select a variable-length coding table according to the maximum variation range of the mixed signal generated by the mixed signal generating unit; and
a variable-length coding unit configured to variable-length code the mixed signal using the variable-length coding table selected by the table selection unit.

9. An image decoding apparatus which decodes a coded image, the apparatus comprising:
an obtaining unit configured to obtain a coded mixed signal which is a mixed signal that has been coded;
a maximum variation range calculating unit configured to calculate a maximum variation range of the mixed signal based on a total number of reference pictures included in at least one reference picture list, the maximum variation range indicating a total number of possible values of the mixed signal;
a table selection unit configured to select a variable-length decoding table according to the maximum variation range of the mixed signal;
a variable-length decoding unit configured to variable-length decode the coded mixed signal using the variable-length decoding table selected by the table selection unit; and
a dividing unit configured to divide the decoded mixed signal decoded by the variable-length decoding unit into first information and second information, the first information identifying the at least one reference picture list used in inter prediction of the image out of a plurality of reference picture lists, the second information identifying at least one reference picture used in the inter prediction of the image out of the reference pictures included in the at least one reference picture list identified by the first information.

10. A non-transitory computer-readable recording medium on which a program is recorded for causing a computer to code an image, the program causing the computer to execute:
obtaining first information and second information from a current signal to be coded, the first information identifying at least one reference picture list used in inter prediction of the image out of a plurality of reference picture lists, the second information identifying at least one reference picture used in the inter prediction of the image out of reference pictures included in the at least one reference picture list identified by the first information;
mixing the first information and the second information to generate a mixed signal;
calculating a maximum variation range of the mixed signal based on a total number of the reference pictures included in the at least one reference picture list, the maximum variation range indicating a total number of possible values of the mixed signal;
selecting a variable-length coding table according to the maximum variation range of the mixed signal; and
variable-length coding the mixed signal using the selected variable-length coding table.

11. A non-transitory computer-readable recording medium on which a program is recorded for causing a computer to decode a coded image, the program causing the computer to execute:
obtaining a coded mixed signal which is a mixed signal that has been coded;
calculating a maximum variation range of the mixed signal based on a total number of reference pictures included in at least one reference picture list, the maximum variation range indicating a total number of possible values of the mixed signal;
selecting a variable-length decoding table according to the maximum variation range of the mixed signal;
variable-length decoding the coded mixed signal using the selected variable-length decoding table; and
dividing the decoded mixed signal into first information and second information, the first information identifying the at least one reference picture list used in inter prediction of the image out of a plurality of reference picture lists, the second information identifying at least one reference picture used in the inter prediction of the image out of the reference pictures included in the at least one reference picture list identified by the first information.

12. An integrated circuit which codes an image, the integrated circuit comprising:
an obtaining unit configured to obtain first information and second information from a current signal to be coded, the first information identifying at least one reference picture list used in inter prediction of the image out of a plurality of reference picture lists, the second information identifying at least one reference picture used in the inter prediction of the image out of reference pictures included in the at least one reference picture list identified by the first information;
a mixed signal generating unit configured to mix the first information and the second information obtained by the obtaining unit to generate a mixed signal;
a maximum variation range calculating unit configured to calculate a maximum variation range of the mixed signal based on a total number of the reference pictures included in the at least one reference picture list, the maximum variation range indicating a total number of possible values of the mixed signal;
a table selection unit configured to select a variable-length coding table according to the maximum variation range of the mixed signal generated by the mixed signal generating unit; and a variable-length coding unit configured to variable-length code the mixed signal using the variable-length coding table selected by the table selection unit.

13. An integrated circuit which decodes a coded image, the integrated circuit comprising:

an obtaining unit configured to obtain a coded mixed signal which is a mixed signal that has been coded;

a maximum variation range calculating unit configured to calculate a maximum variation range of the mixed signal based on a total number of reference pictures included in at least one reference picture list, the maximum variation range indicating a total number of possible values of the mixed signal;

a table selection unit configured to select a variable-length decoding table according to the maximum variation range of the mixed signal;

a variable-length decoding unit configured to variable-length decode the coded mixed signal using the variable-length decoding table selected by the table selection unit; and a dividing unit configured to divide the decoded mixed signal decoded by the variable-length decoding unit into first information and second information, the first information identifying the at least one reference picture list used in inter prediction of the image out of a plurality of reference picture lists, the second information identifying at least one reference picture used in the inter prediction of the image out of the reference pictures included in the at least one reference picture list identified by the first information.

* * * * *